United States Patent [19]

Kojima et al.

[11] Patent Number: 5,152,047
[45] Date of Patent: Oct. 6, 1992

[54] METHOD OF PRODUCING LAMINATED METAL BELT

[75] Inventors: Masayasu Kojima; Chihiro Hayashi, both of Osaka, Japan

[73] Assignee: Sumitomo Metal Industries, Ltd., Osaka, Japan

[21] Appl. No.: 508,595

[22] Filed: Apr. 13, 1990

[30] Foreign Application Priority Data

Apr. 14, 1989 [JP] Japan ................................ 1-95934

[51] Int. Cl.$^5$ ..................... B21D 22/14; B21D 22/20; B21D 53/14
[52] U.S. Cl. ........................... 29/411; 29/414; 29/424; 72/70; 72/347; 156/137
[58] Field of Search ............... 72/111, 347, 70, 82; 29/400.1, 412, 414, 417, 423, 424, 527.1, 527.2, 411; 156/137, 142; 264/157, 159, 292

[56] References Cited

U.S. PATENT DOCUMENTS

| | | | |
|---|---|---|---|
| 2,075,815 | 4/1937 | Knox | 29/424 |
| 3,263,319 | 8/1966 | Tifft et al. | 72/347 |
| 3,938,723 | 2/1976 | Slaughter | 29/423 |

FOREIGN PATENT DOCUMENTS

| | | | |
|---|---|---|---|
| 24362 | 3/1981 | European Pat. Off. | |
| 199487 | 10/1986 | European Pat. Off. | 72/347 |
| 1452258 | 10/1970 | Fed. Rep. of Germany | 29/424 |
| 56-6629 | 3/1976 | Japan . | |
| 56-30041 | 3/1981 | Japan . | |
| 56-84139 | 7/1981 | Japan . | |
| 57-161335 | 10/1982 | Japan . | |
| 57-163750 | 10/1982 | Japan . | |
| 58-118351 | 7/1983 | Japan . | |
| 58-159937 | 9/1983 | Japan . | |
| 61-140339 | 6/1986 | Japan . | |
| 61-180630 | 8/1986 | Japan . | |
| 0266844 | 11/1986 | Japan . | |
| 62-155352 | 7/1987 | Japan . | |
| 63-96258 | 4/1988 | Japan . | |
| 0048603 | 9/1988 | Japan | 72/111 |
| 0836812 | 6/1960 | United Kingdom | 29/423 |
| 1386123 | 3/1975 | United Kingdom . | |
| 2139923 | 11/1984 | United Kingdom . | |
| 2184513 | 6/1987 | United Kingdom . | |

Primary Examiner—Michael W. Ball
Assistant Examiner—Steven D. Maki
Attorney, Agent, or Firm—Burns, Doane, Swecker & Mathis

[57] ABSTRACT

A method of producing a laminated metal belt with a space corresponding to the thickness of resin between respective ring belts by a step for forming a laminated sheet by bonding the number of metal sheets corresponding to the number of ring belts constituting the laminated metal belts of one unit with resin, a step for forming a seamless cylindrical body having predetermined inside and outside diameters from the laminated sheet, a step for cutting the cylindrical body radially into sections to obtain laminated rings and a step for removing resin from the laminated ring.

40 Claims, 18 Drawing Sheets

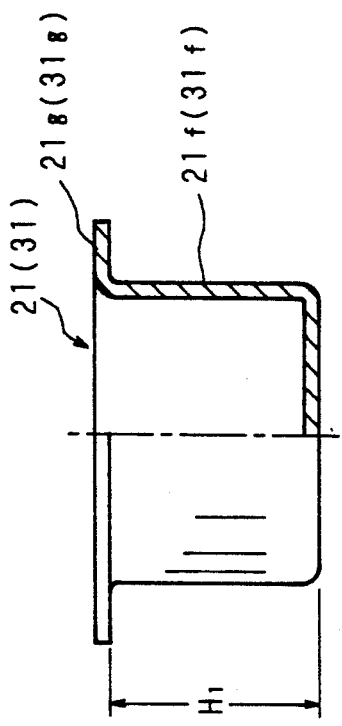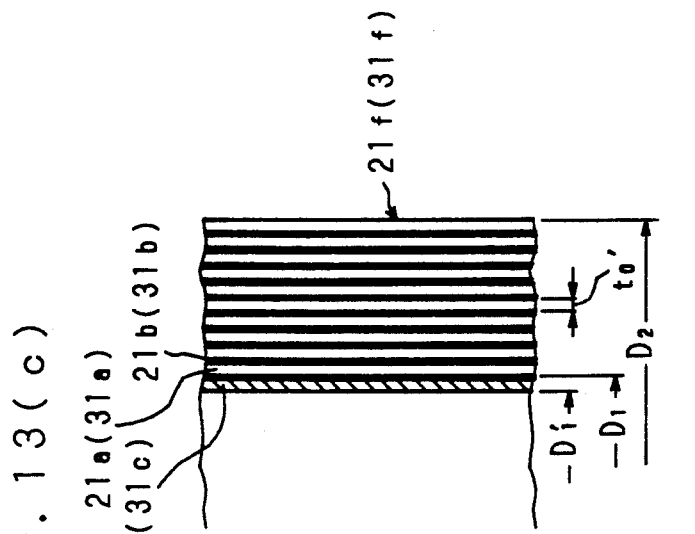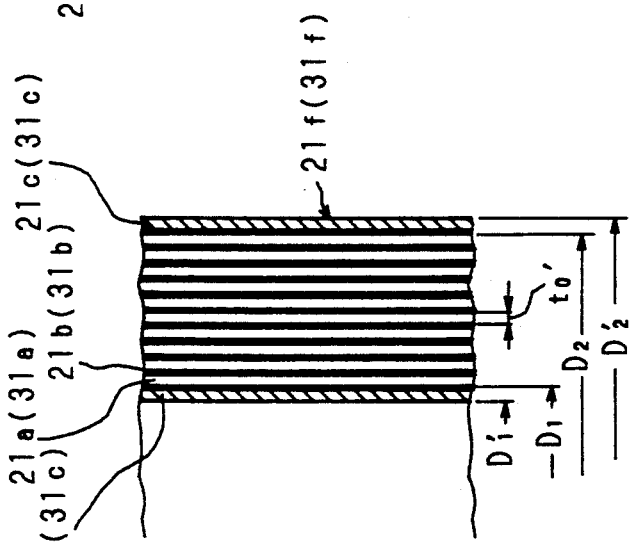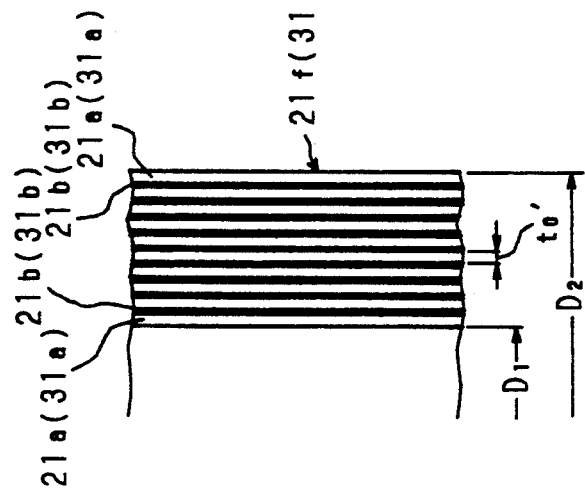

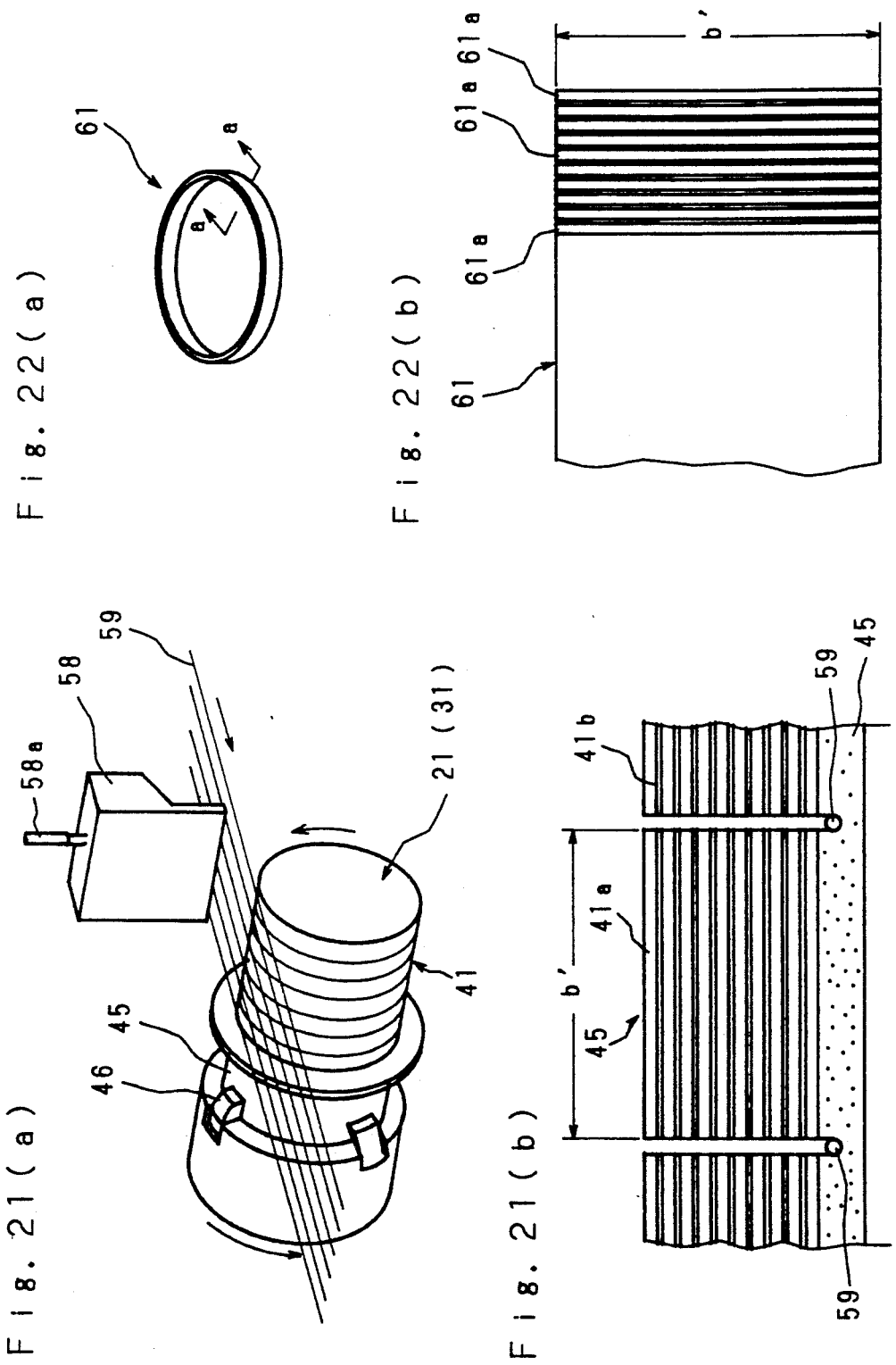

METHOD OF PRODUCING LAMINATED METAL BELT

BACKGROUND OF THE INVENTION

1. Field of the Invention

The present invention relates to a method of producing a laminated metal belt from a laminated metal sheet material which is installed on a drive pulley and a driven pulley for transmitting power.

2. Description of Related Art

FIG. 1 is a schematic view of the state wherein a ring laminated metal belt 1 is used. The ring laminated metal belt 1 is used not only for transmitting power but also be used in a nonstep variable speed gear which is able to adjust the running speed freely while maintaining constant revolutions of the pulley 2, by making radii r, R of pulleys 2, 3 adjustable to which the ring laminated metal belt 1 is installed.

The ring laminated metal belt 1 installed on the pulleys 2, 3 has a portion bent at a predetermined radius r or R and a portion stretched straightly between the pulleys 2, 3, so that repetitive bending and restoring deformation is applied on the belt by the rotation of the pulleys. Thus, the belt must be sufficiently flexible against bending and having a necessarily sufficient strength against the tension for transmitting power. As a material of such a belt, various kinds have been proposed hitherto, and for example, fiber reinforced rubber, a firmly woven fiber, leather etc. have been widely used.

However, though these belts of nonmetal material are flexible and sufficiently endurable to the repetitive bending and restoring deformation, tensile strength per unit sectional area is limited. Thus, when the large power is to be transmitted, it is forced to apply a wider belt, install plural belts in multiple or the like, which results in a large space occupied by the pulleys and the traveling belt therebetween, and further the weight of the pulley itself becomes heavier. Accordingly, for such use as a nonstep various speed gear of an automobile where the installing space is limited, the light weight and high reliability on the break proof are required, a nonmetal belt can not be used and the strong metal belt must be employed.

Also in this case, the structure and material which do not create the fatigue fracture by the repetitive bending and restoring are naturally required.

The metal belt is used generally in the laminated state wherein a plurality of ring belts, each peripheral length being slightly different, are fitted inwardly or outwardly. The fitted condition between the adjoining ring belts is adjusted to develop a relative slide circumferentially with a moderate frictional resistance, so as to create a slide between the ring belts during the repetitive bending and restoring deformation, and not to produce excessive tensile and compressive stresses on the individual ring belt. The reason why the plurality of ring belts are laminated is to secure enough entire sectional area of the belt to prevent the tensile fracture of the belt used by applying the tension.

The thinner the ring belt, the smaller the tensile stress and compressive stress due to bending and restoring, thus the bending and restoring fatigue fracture hardly occurs. Accordingly, it is not necessary to use such a strong material. However, since a production cost is increased by making the ring belt thinner, the thickness of the ring metal belt is set around 0.2 mm currently. In this thickness, maraging steel is required from the viewpoint of the strength against fatigue, besides generally the hardening heat treatment by aging and so forth or further the surface hardening heat treatment by nitriding and so forth are performed.

A conventional method of producing a ring laminated metal belt is divided roughly into a method of using a sheet material and a method of using a seamless steel pipe material.

In the former method disclosed, for example, in Japanese Patent Application Laid-Open No. 57-161335 (1982) and Japanese Patent Application Laid-Open No. 58-159937 (1983), end portions of a band sheet material having the same thickness, width and length of one ring belt constituting a laminated belt are butted and welded together into a ring. After the heat treatment for unifying the strength of the welded portion and the other portion, it is finished into a predetermined thickness and peripheral length by ring rolling, then hardened by the heat treatment and formed into a ring, a plurality of which are fitted in multiple into a laminated belt.

In the latter method, a seamless steel pipe having a predetermined thickness and outside diameter is cut into section to the width corresponding to one ring belt, and after annealed, if necessary, finished into a predetermined thickness and peripheral length by ring rolling, then hardened by the heat treatment and fitted in multiple into a laminated belt.

The plural ring belts constituting one unit of laminated belt are so produced that every ring belt has a different peripheral length to be fitted in multiple. However, as previously stated, a delicate fitted condition must be maintained all around the peripheral to create the relative slide with a moderate frictional resistance between the adjoining rings. Obtaining such fitted condition by only adjusting the thickness and peripheral length in ring rolling, a great deal of labor is required and productivity is considerably spoiled.

Also, the thinner the ring belt the more delicate the thickness reduction adjustment for adjusting the peripheral length, thus not only an enormous amount of work is necessitated but also yield of non-effective unit extremely lowers.

As a countermeasure, a circumferential expanding method has been proposed to stick the adjoining ring belts together moderately, after plural ring belts are combined to form one unit of laminated belt. For example, such a method by split tools disclosed in Japanese Patent Application Laid-Open No. 56-30041 (1981) and Japanese Patent Application Laid-Open No. 56-84139 (1981), or a method by heat expansion of a core metal disclosed in Japanese Patent Application Laid-Open No. 57-163750 (1982).

Even by these methods, however, it is difficult to accomplished a delicate size adjustment at 1/100 mm level perfectly. Therefore, as stated in Japanese Patent Application Laid-Open No. 58-118351 (1983), a method has been devised to prepare a belt once in which the ring belts are joined together, then decompose them to polish chemically, and after reduction in thickness to obtain the moderate fitted condition combine them again. However, there is such a problem in any of the methods aforementioned that a great deal of labor is necessitated in adjusting the fitted condition between the adjoining ring belts.

SUMMARY OF THE INVENTION

The present invention has been devised to solve the problems mentioned above, therefore.

It is a first object of the invention to provide a method of producing a laminated metal belt, wherein after preparing a laminated material by laminating metal sheets corresponding to the number of ring belts constituting the laminated metal belt of one unit bonded with a resin to form seamless cylindrical body therefrom, the cylindrical body is cut radially and the resin is removed to produce the laminated metal belt of one unit, thereby a delicate adjustment of fitted condition of the ring belts is not needed, and the number of ring belts necessary to constitute one unit can be obtained simultaneously.

It is a second object of the invention to provide a method of producing a laminated metal belt, wherein an auxiliary plate is bonded to at least one surface of a laminated material prepared by bonding metal sheets with resin to form a seamless cylindrical body arranging the auxiliary plate inside, thereby when forming the cylindrical body, wrinkles developed on the edge of the cylindrical body may be prevented, so that a thinner metal sheet is applicable where fatigue fracture rarely occurs.

It is a third object of the invention to provide a method of producing a laminated metal belt, wherein an auxiliary plate is bonded to at least one surface of a laminated material prepared by bonding metal sheets with resin to form a seamless cylindrical body arranging the auxiliary plate inside, thereby when cutting the cylindrical body into rings, a core member is not necessary to be pressed into the cylindrical body.

It is a fourth object of the invention to provide a method of producing a laminated metal belt, wherein an auxiliary plate is bonded to at least one surface of a laminated material prepared by bonding metal sheets with resin, thereby the auxiliary plate works as a protection for preventing the metal sheet to be scarred when forming a cylindrical seamless body.

The above and further objects and features of the invention will more fully be apparent from the following detailed description with accompanying drawings.

BRIEF DESCRIPTION OF THE DRAWINGS

FIG. 12 is a half-cut view of a laminated shell, FIG. 13 is a fragmentary enlarged sectional view of a laminated shell formed by the laminated blank shown in FIGS. 4 or 5, FIG. 21 is a perspective view and a sectional view showing a cutting mode with a wire saw, FIG. 22 is a perspective view of a laminated ring belt and a sectional view taken along the line a—a thereof.

DESCRIPTION OF THE PREFERRED EMBODIMENTS

The present invention will be described specifically with reference to the drawings showing its embodiments.

Figure 1:
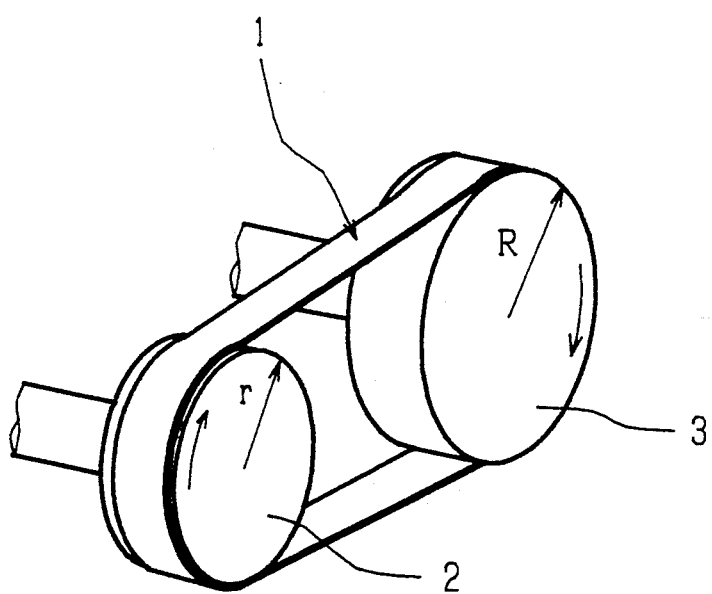
FIG. 1 is a perspective view showing the state wherein a laminated metal belt is used.
Figure 2A:
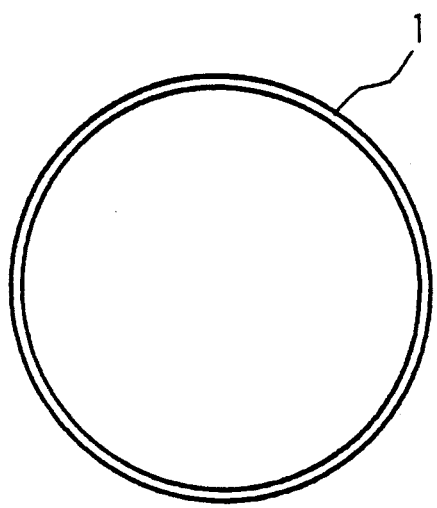
FIG. 2 is a schematic front view of a laminated belt produced by a method of the invention.
Figure 2B:
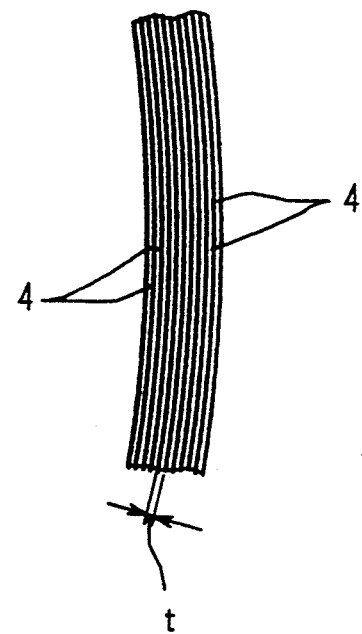
Figure 2C:
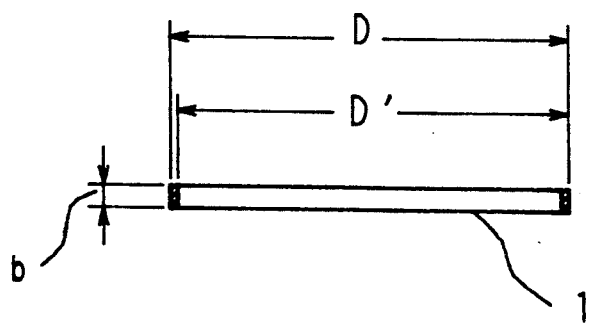

FIG. 2(a) is a schematic front view of a ring laminated metal belt produced by a method of the invention, FIG. 2(b) is a fragmentary enlarged view and FIG. 2(c) is a transverse sectional view of FIG. 2(a), wherein numeral 1 designates the ring laminated metal belt (hereinafter merely referred to as a laminated belt), and numeral 4 denotes a ring belt constituting the laminated belt 1. The laminated belt 1 is constituted by a plurality of ring belts 4, 4 . . . which are fitted in multiple, the adjoining ring belts 4, 4 are adapted to create a relative slide therebetween with a suitable frictional resistance.

Figure 3:
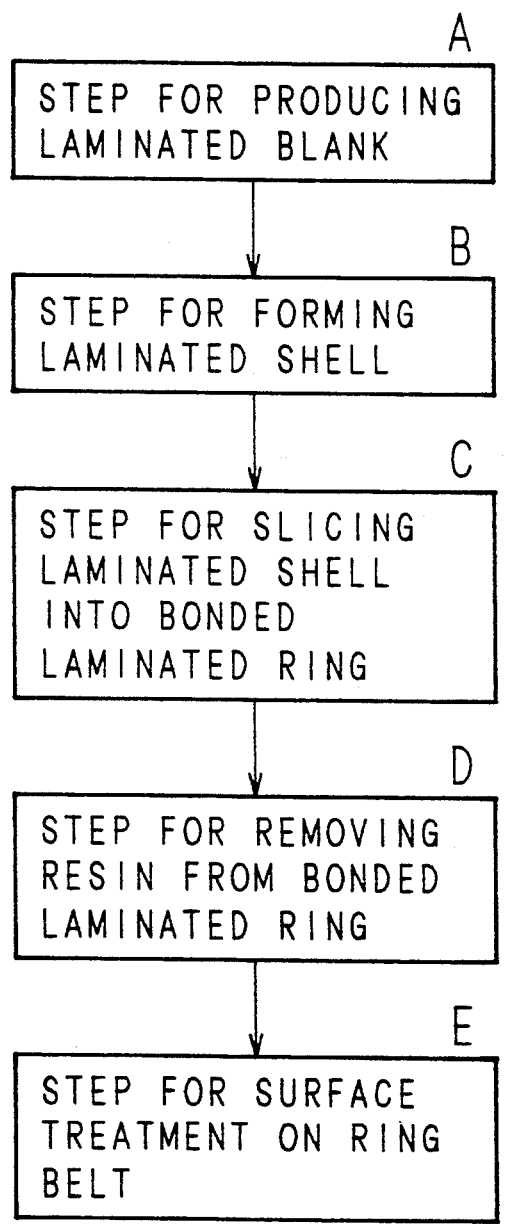
FIG. 3 is a flow diagram showing essential processes of a method of the invention.

FIG. 3 is a process diagram showing essential processes of a method of the invention comprising; a step A in which a laminated material (hereinafter referred to as a laminated blank) is produced by laminating a plurality of blank sheets which are bonded in multiple with resin layers interposed therebetween, a step B in which the laminated blank is formed into a laminated shell having a cylindrical wall by press forming or spinning, a step C in which the laminated shell is cut into annular sections annularly with a cutting tool, blade, laser beams, wire sawing etc. to obtain a bonded laminated ring, a step D in which bonding resin in the bonded laminated ring is removed and a step E in which the laminated ring whose bonding resin is removed or the ring belt constituting the laminated ring is treated in the surface and/or any other treatment.

Each of the processes will be described specifically in the following.

(A) Producing laminated blank

Figure 4A:
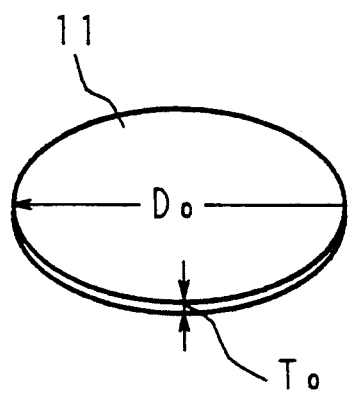
FIG. 4 is a perspective view and a fragmentary enlarged sectional view of a laminated blank.
Figure 4B:
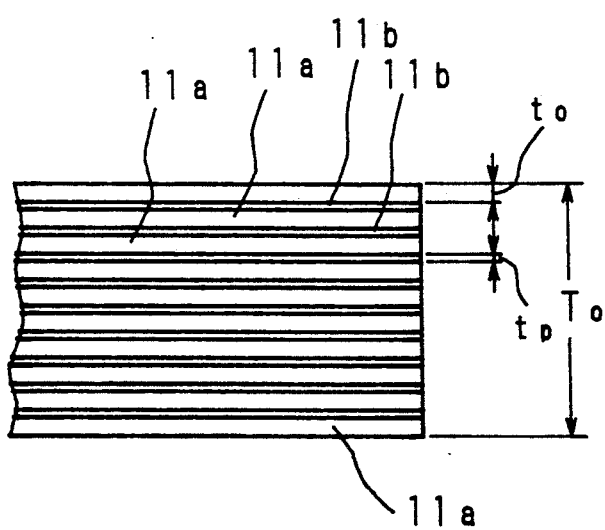

FIG. 4 shows a laminated blank 11 used in a method of the invention, FIG. 4(a) shows its perspective view and FIG. 4(b) shows its fragmentary enlarged sectional view. The laminated blank 11 is formed by laminating a plurality of disc-like blank sheets 11a bonded with resin layers 11b interposed therebetween as shown in FIG. 4(b). The blank sheet 11a is the same material as the laminated belt 1 and the number of sheets is as same as that of the ring belts 4, 4, . . . constituting the laminated belt 1 of one unit. The diameter $D_0$ of the laminated blank 11 is selected to be available for deep drawing to be described later, and the thickness $t_0$ of the blank sheet 11a is selected to be the same or thicker than the thickness t of the ring belt 4 constituting the laminated belt 1 to be finished to the plate thickness t by ironing to be described later.

There are two purposes for bonding the blank sheets 11a, 11a together with the resin layer 11b.

One of the purposes is to deform the plurality of blank sheets 11a constituting the laminated blank 11 integrally to inhibit the fracture and wrinkles in the process B by press forming, spinning or the like to be described later. Another purpose is to obtain the gap between the adjoining ring belts 4, 4 by remaining the thin resin layer 11b therebetween in the laminated shell 21 after press forming or spinning, cutting it into annular sections to produce the bonded laminated ring 41 and removing the resin layer 11b therefrom.

Figure 11A:
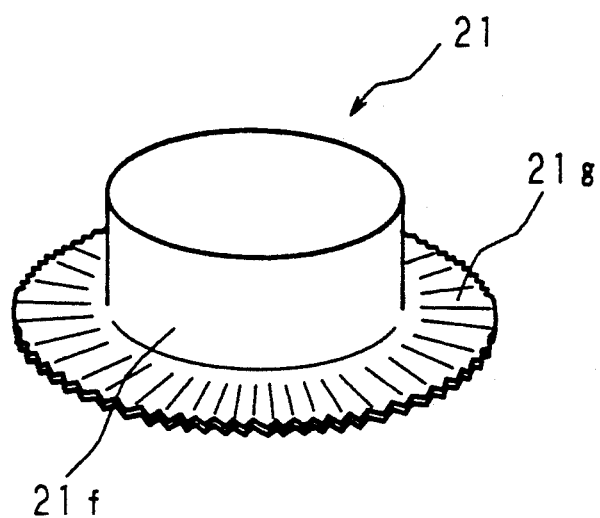
FIG. 11 is a perspective view of a laminated shell deep drawn unsuccessfully.

Accordingly, as the resin layer 11b a material having enough bonding strength to hold the blank sheet 11a in press forming or spinning, and enough ductility to follow the deformation of the blank sheet 11a such as polypropylene or the like is used. When the resin itself is not strong enough, wrinkles tend to develop and enlarge in the deep drawing to be described later (refer to FIG. 11 (a)), and the resin layer becomes excessively thin by ironing, thus the suitable gap between the adjoining ring belts 4, 4 of the laminated belt 1 cannot be secured. When the ductility becomes poor due to the excessive bonding strength, it cannot resist deformation at press forming or spinning and the sheet is to be cracking or the metal sheets are separating.

The strength of the resin layer 11b is generally evaluated by the shearing strength $\tau$ obtained by dividing the maximum tensile force in the period from starting to apply a stretching force to each one end portion of a pair of metallic samples whose other end portions are overlapped and bonded with resin until the bonding force is lost, by the bonded area.

According to an experiment of the inventor, it has been confirmed that a good result is obtained by selecting the resin having the shearing strength $\tau$ of 150 to 250 kgf/cm$^2$.

The thickness $t_p$ of the resin layer 11b is as determined as to obtain the gap required between the adjoining ring belts 4, 4 of the laminated belt 1 after the press forming or spinning to be described later. The gap between the ring belts 4, 4 is preferably 5 to 20 $\mu$m. According to an experiment of the inventor, in case of the resin having the shearing strength $\tau$ of 150 to 250 kgf/cm$^2$, the aforesaid gap is obtained by the thickness $t_p$ be taken as 20 to 100$\mu$. Incidentally, it is not necessary for the thickness $t_p$ to be equivalent for all of the resin layers 11b of the laminated blank 11, it may be suitably changed for every resin layer 11b in the stage of the laminated blank 11 so as to obtain a suitable gap between the respective ring belts 4, 4 in the state of the laminated belt 1.

Figure 5A:
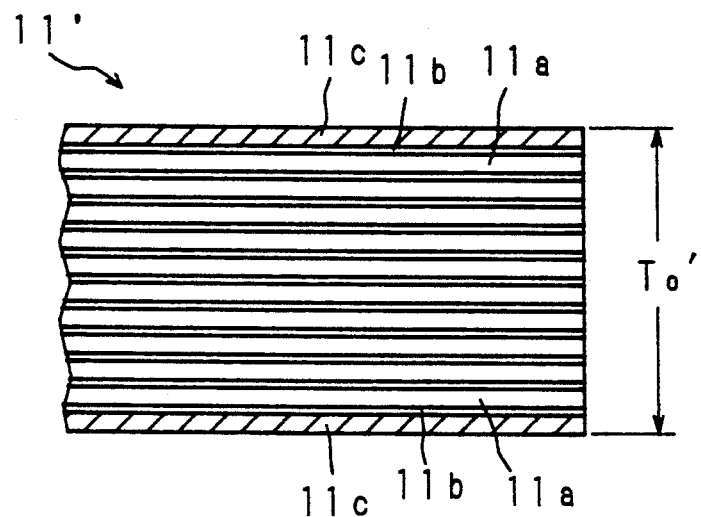
FIG. 5 is a fragmentary enlarged sectional view showing another embodiment of a laminated blank.
Figure 5B:
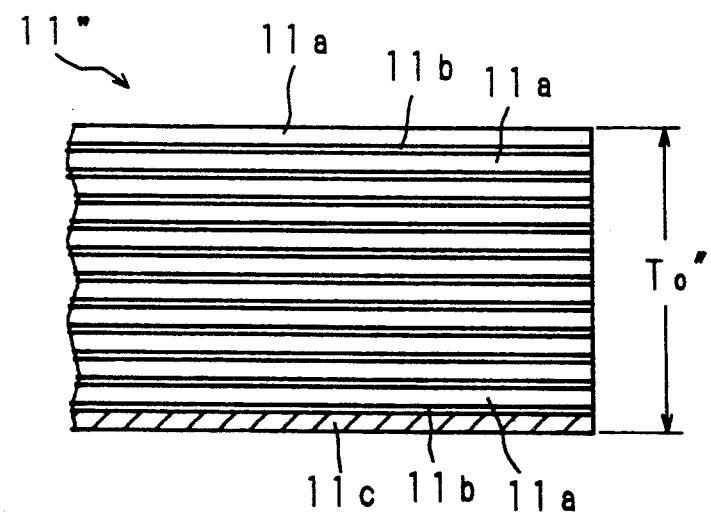

FIG. 5(a), (b) are fragmentary enlarged views of another laminated blanks 11', 11'' used in the method of the invention. FIG. 5(a) shows an organization in which auxiliary plates 11c, 11c are laminated and bonded on both surfaces, and FIG. 5(b) illustrates the auxiliary plate 11c being bonded to one surface. The other elements are substantially the same as those shown in FIG. 4(b), so that the like reference numerals are given to the like or corresponding parts and the explanation will be omitted.

Such a laminated blank 11 is produced in the following manner.

A method of bonding a blank sheet 11a with resin is divided roughly into two methods. One method is to laminate coiled metal sheets continuously, and the other method is to bond a predetermined number of metal sheets with the resin layer 11b interposed therebetween simultaneously.

Figure 6:
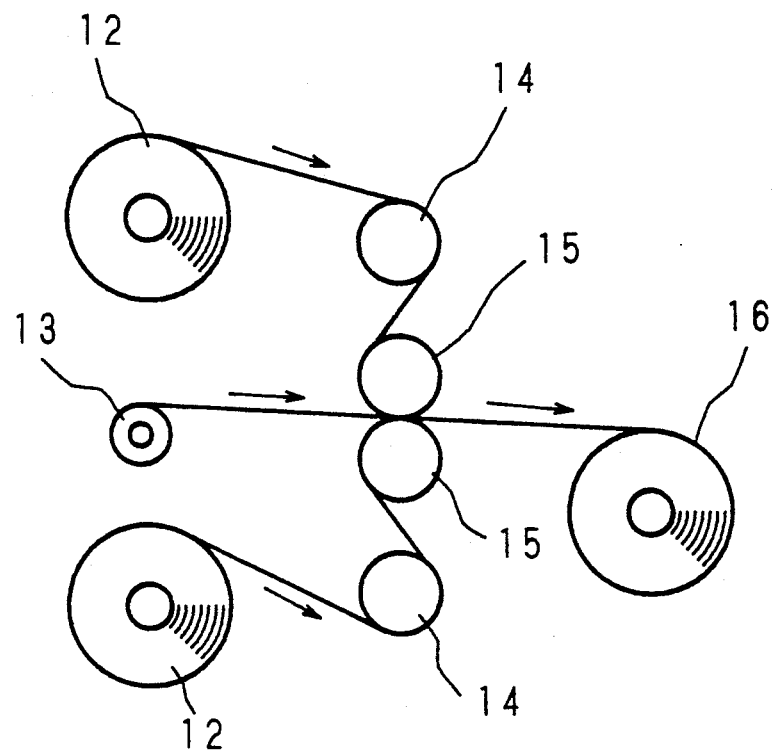
FIG. 6 is a schematic view of an apparatus used for producing a laminated blank.

FIG. 6 shows the former in the laminating and bonding mode. The metal coils 12, 12 of the same material and thickness as the blank sheet 11a are preheated respectively by the hot heat rolls 14, 14 and a coiled plastic resin film 13 having adhesive quality is passed through the heat rolls 15, 15 so as to be pressed thereon in the molten state to obtain a bonded laminated coil 16 after cooling.

Figure 7A:
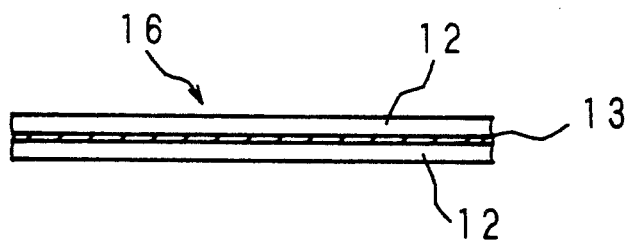
FIG. 7 is a fragmentary enlarged sectional view showing production process of the laminated blank.
Figure 7B:
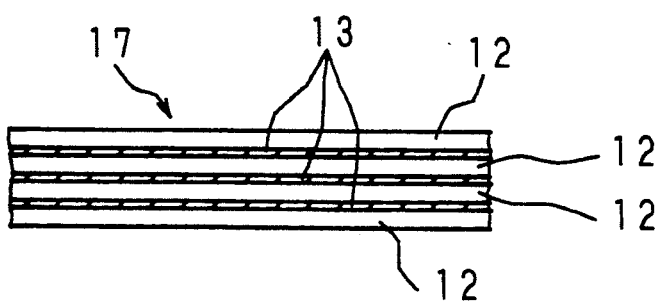

FIG. 7(a) shows a sectional view of the bonded laminated coil 16. When the bonded laminated coil 16 with two layers thus obtained is used again in place of the metal coils 12, 12 shown in FIG. 6, a bonded laminated coil 17 with four layers shown in FIG. 7(b) is obtained. By repeating this the bonded laminated coil 17 laminated with an even number of metal sheets is obtained. When laminating and bonding an odd number of metal sheets, a non-layered metal coil may be used in place of either of the metal coils 12 once in either of the bonding processes after the second time. The bonded laminated coil 17 with n layers thus obtained is, for example, punched out to obtain the laminated blank 11 as shown in FIG. 4.

Figure 8A:
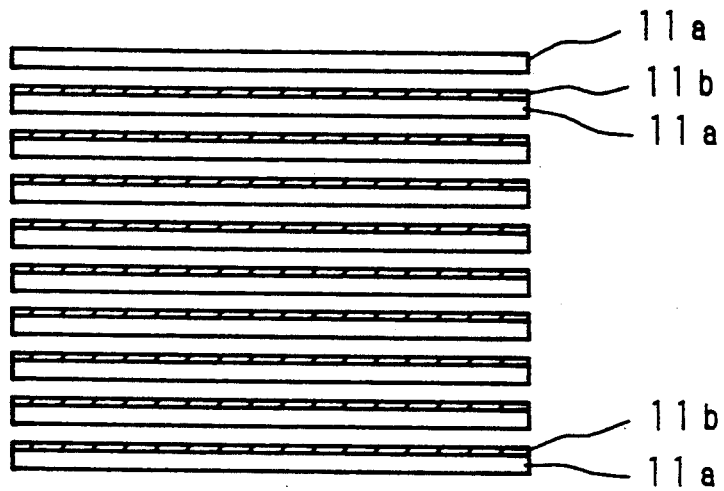
FIG. 8 is a fragmentary enlarged sectional view showing another production process of a laminated blank.
Figure 8B:
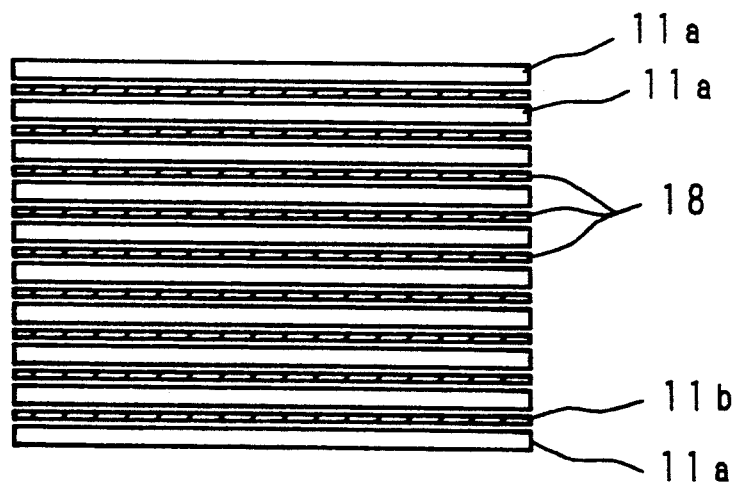

FIG. 8 is an explanatory view of a bonding and laminating method of the latter case wherein a predetermined number of blank sheets 11a are bonded simultaneously. FIG. 8(a) shows the case wherein resin covered sheets formed by sticking the resin layer 11b on one surface of the disc-like blank sheet 11a are piled up, and the blank sheet 11a without the resin layer 11b is placed on the top, while FIG. 8(b) shows the case wherein the blank sheets 11a and resin films 19 are alternately piled up, the blank sheets 11a being pressed together while heated so as to be laminated and bonded integrally. One method of producing the resin covered sheet shown in FIG. 8(a) is to coat one surface of a single blank sheet 11a with a liquid resin, and the other method is, as shown in FIG. 9, to preheat the metal coil 12 of the same material and thickness as the blank sheet by a first heat roll 14, and onto the metal coil 12 wound on a second heat roll 15, to press a coiled plastic resin film 13 having self-adhering by a roller 15a so as to be molten and stuck to obtain a single-face resin covered coil 19 after cooling, then to punch out it, for example.

Figure 9:
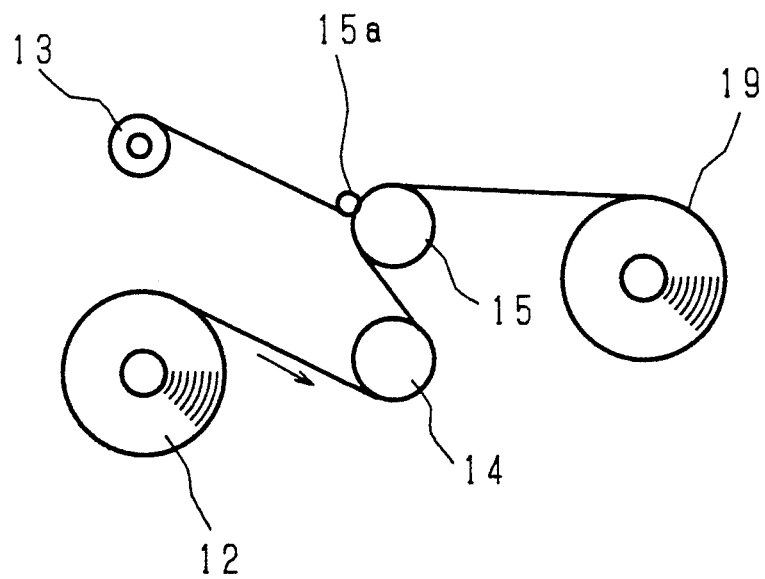
FIG. 9 is a schematic view of an apparatus used therein.

Though FIGS. 7, 8 and 9 show the laminating and bonding methods for obtaining the laminated blank 11 shown in FIG. 4(b), the laminated blank 11 with the auxiliary plate 11c as shown in FIGS. 5(a), (b) may also be formed in the same manner.

Incidentally, it is also a suitable method to produce the circular laminated blank 11 as shown in FIG. 10 by punching out from the rectangular metal sheets laminated and bonded.

(B) Forming Process

Next, a process of forming the laminated blank 11 into a laminated shell having a cylindrical wall by the press forming or spinning will be described.

a) Forming Molding

Figure 10A:
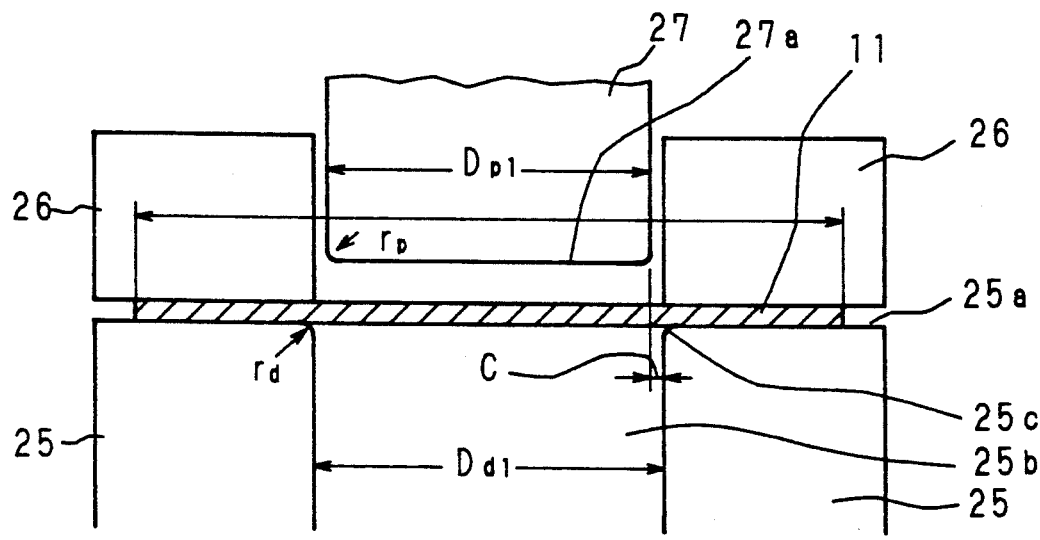
FIG. 10 is a sectional view showing a deep drawing process in which deep drawing and ironing are carried out simultaneously.
Figure 10B:
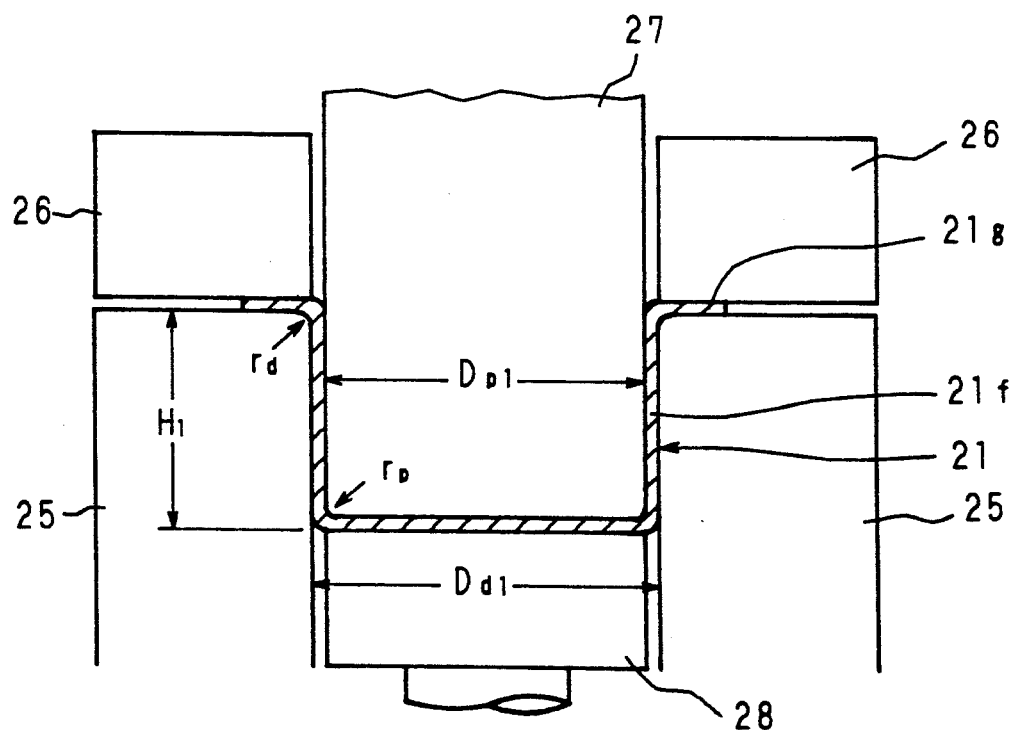

FIG. 10 is an explanatory view of a deep drawing, FIG. 10(a) shows the state immediately before deep drawing and FIG. 10(b) shows the state immediately after the end of a punch travel. First, as shown in FIG. 10(a), the laminated blank 11 is set on the face 25a of a die 25 concentrically with a die hole 25b; and a blank holding pad 26 is descended from above to press and hold it by means of a pressure device not shown. Thereafter, a punch 27 is descended from above by means of an actuating device not shown to press the laminated blank 11 disposed just above the die hole 25b by a punch bottom face 27a so as to be pressed into the die hole 25b through die shoulders 25c of the die face 25a. The blank holding pad 26 is intended for inhibiting wrinkles of a flange 21g, a pressure being applied as much as possible within the range not generating fracture.

The thinner the blank sheet 11a constituting the laminated blank 11, the more easily the flange collapses into, wrinkles and the flange wrinkles cannot be eliminated even when the pressing force is increased to the breaking limit. One of the purposes of bonding the auxiliary plates 11c to both outer surfaces of FIG. 5(a) is to prevent the flange wrinkles, which can be inhibited effectively by making the auxiliary plate 11c thicker than the blank sheet 11a. This is because that rigidity of the auxiliary plate 11c serves as resistance to the buckling of the laminated blank 11.

The inventor has confirmed by an experiment that the flange wrinkles can be prevented completely by making the thickness of the auxiliary plate 11c about 0.8 mm, even when the thickness of the blank sheet 11a is reduced to about 0.1 mm. Accordingly, as previously stated, the thinner the blank sheet 11a the more the fatigue durability, so that when maraging steel is used in the blank sheet 11a as in the past, the process can be simpler by omitting the heat hardening. Furthermore, inexpensive materials having the lower strength may be used.

Figure 11B:
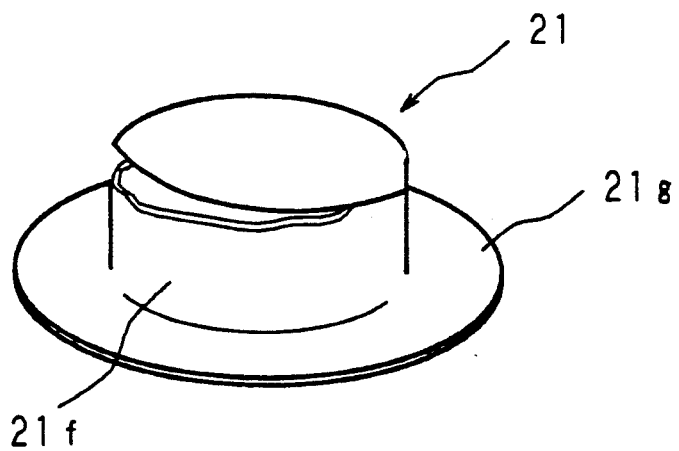

After obtaining the laminated shell 21 having a cylindrical body 21f as shown in FIG. 10(b), the punch 27 is ascended and the laminated shell 21 is taken out from the die 25. Then, the blank holding pad 26 is raised and a knock out plate 28 is ascended by an actuating device not shown to take out the laminated shell 21 from the die hole 25b. Though the corner radius $r_d$ of the die shoulder 25c is smaller the better for preventing the wrinkles at this portion, if it is too small the fracture tends to occur between the flange 21g and the body 21f. According to an experiment of the inventor, in the case of laminated blank 11 of FIG. 4(b), a suitable range of $r_d$ is 5 to 15 to $t_0$ (where $t_0$: thickness of the blank sheet 11a). Though the corner radius $r_p$ of the punch shoulder 27a is smaller the better to obtain a long straight portion of the body 21f in the laminated shell 21, if it is too small the fracture occurs at a circumferential portion of the laminated shell 21 as shown in FIG. 11(b), so that $r_p$ is preferably 5 to 15 $t_0$.

In the case of laminated blank 11' of FIG. 5(a), or in the case of laminated blank 11" of FIG. 5(b) wherein the deep drawing is carried out by facing the auxiliary plate 11c to the punch 27, since the wrinkles on the metal sheet 11a at the die shoulder 25c are inhibited by the auxiliary plate 11c, $r_d$ may be larger than the value stated above.

There are three reasons to leave the wide flange 21g on the laminated shell 21 in FIG. 10(b).

The first reason is to prevent wrinkles on the flange edge which may occur when the peripheral edge of the flange 21 is released from the blank holding pad 26 as approaching to the die shoulder 25c. The second reason is to avoid difficulty in cutting into sections to be described later due to insufficient rigidity near the opening of the cylindrical body 21f when the flange 21g is drawn completely into the die hole 25b. The third reason is to strip the laminated shell 21 from the punch 27 easily since the flange 21g can be held by the blank holding pad 26 as previously described. When the aforesaid problems are not encountered, the deep drawing can naturally be continued until the flange 21g is drawn completely into the die hole 25b to improve the yield of the material.

FIG. 12 is a half-cut view of the laminated shell 21, FIG. 13(a) is a fragmentary enlarged sectional view of the cylindrical body 21f of the laminated shell 21 obtained by using the laminated blank 11 shown in FIG. 4, FIG. 13(b) and FIG. 13(c) are fragmentary enlarged sectional views of the body 21f of the laminated mold 21 obtained by using respectively the laminated blank 11' or 11" shown in FIG. 5(b) or FIG. 5(c).

Incidentally, though the auxiliary plate 11c shown in FIG. 13(c) is disposed inward it is also proper to be disposed outward.

In such a deep drawing, a material on the die surface 25 is subjected to bending and restoring deformation when moving through the die shoulder 25c. Thereby, an uneven residual stress distribution is formed in the direction of thickness on the metal of cylindrical body 21f of the laminated shell 21 shown in FIG. 12. As a result, as to be described later, in laminated rings 41 obtained by cutting the body 21f of the laminated shell 21 into sections, so-called "warp" is created at its lateral intermediate portion bending inward or at the both side lines bending outward. In order to prevent such warp, at deep drawing shown in FIG. 10, ironing is carried out simultaneously by making a thickness of the laminated blank 21 larger than a clearance C between the peripheral surface of the punch 27 and the inner surface of the die 25. The ironing is effective in equalizing the diameter and thickness of the cylindrical body 21f of the laminated shell 21 in the direction of thickness besides preventing the warp. The ironing may not be necessarily performed simultaneously with the deep drawing, but it may be suitable to be conducted thereafter.

Figure 14A:
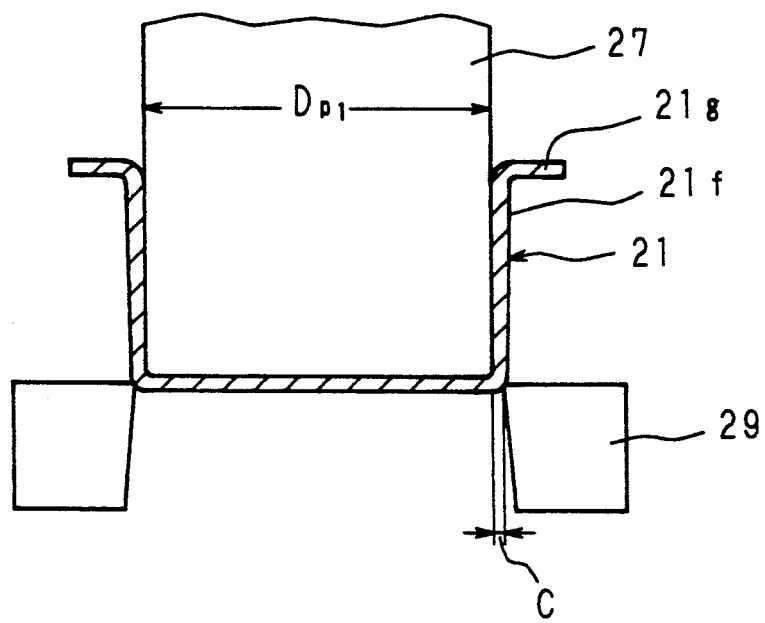
FIG. 14 is a sectional view showing a successive ironing process after deep drawings.
Figure 14B:
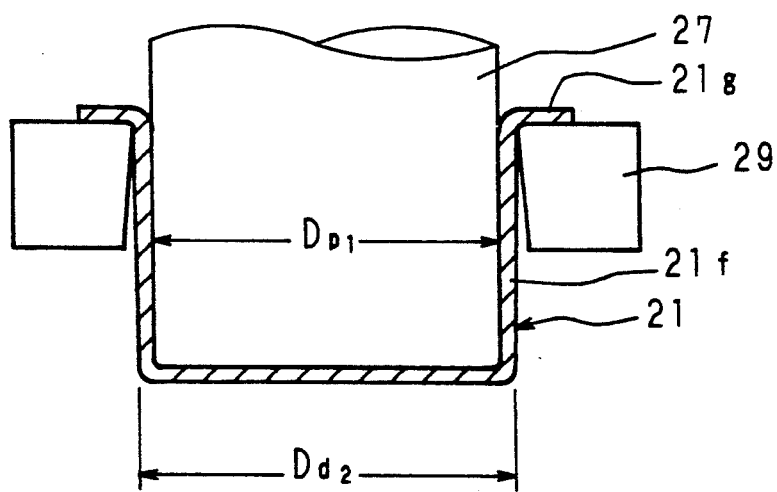

FIG. 14 is a successive explanatory view of an ironing process after deep drawing; FIG. 14(a) shows the state immediately before the ironing and FIG. 14(b) shows the state immediately after. As shown in FIG. 14(a), the laminated shell 21 fitted on the punch 27 is passed through the die 29 as shown in FIG. 14(b) for ironing by a pressuring device not shown.

In a case of a single sheet blank (not laminated), it is popularly known that the blank thickness must be larger than 1.0 to 1.05 times of a clearance C between the punch and the die in FIG. 10 to perform an ironing simultaneously with deep drawing or in FIG. 14 to perform an ironing after deep drawing. In the case of the laminated blank with a plurality of bonded metal sheets, however, since resin layers softer than the metal exist, even when the thicknesses $T_0$, $T_0'$, $T_0''$ of the laminated blank 11, 11', 11" (refer to FIGS. 4(b), 5(a), (b)) are 1.0 to 1.05 times of the clearance C between punch and die 29 in FIG. 10 or in FIG. 14, the ironing cannot be carried out effectively. According to an experiment of the inventor, for equalizing the thickness of metal layers in the cylindrical body $21f$ shown in FIG. 10 or in FIG. 14 in the longitudinal direction and preventing the warp after cutting, the total thickness $T_M$ of the metal layers of the laminated blank must be more than 1.0 to 1.05 times of the clearance C in FIG. 10 or in FIG. 14. The total thickness $T_M$ is $nt_0$ (n: the number of blank sheets 11a) in the case of laminated blank 11 shown in FIG. 4(b), and the value obtained by adding the thickness of the auxiliary plate 11c respectively to $nt_0$ in the case of laminated blank 11', 11" shown in FIG. 5(a), (b).

The inside diameter $D_1$ up to the innermost metal layer 21a and the outside diameter $D_2$ up to the outermost metal layer 21a of the laminated shell 21 after press forming shown in FIG. 13(a), (b), (c) are equivalent respectively to the inside and outside diameters of the product belt. The diameter $D_{p1}$ of the punch 27 is equal to the inside diameter $D_1$ or $D_1'$ of the body of the laminated shell 21. Meanwhile, the die inside diameter $D_{d1}$ (refer to FIG. 10(b)) or the ironing die inside diameter $D_{d2}$ (refer to FIG. 14) are naturally made equal to the outside diameter $D_2$ or $D_2'$ (refer to FIG. 13(a), (b), (c)) of the laminated shell.

b) Spinning

Next, the spinning will be described with reference to FIG. 15.

Figure 15A:
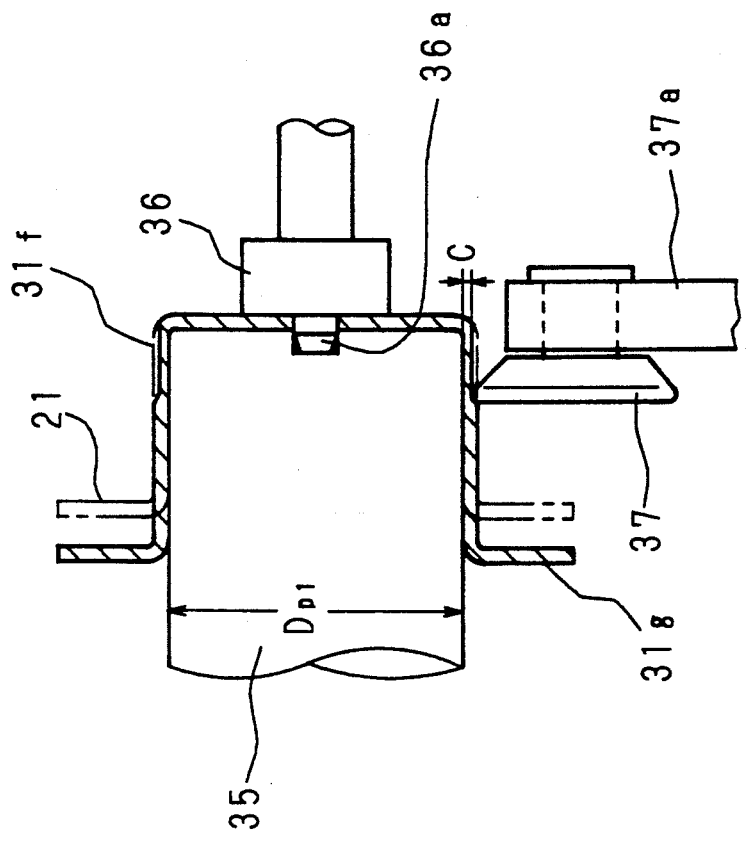
FIG. 15 is a schematic sectional view showing a spinning process.

FIG. 15(a) is an explanatory view of a spinning process of a laminated blank 11, the center of which is provided with a through hole 21e, through which a centering pin 36a of a blank holder 36 is extended to engage to a center hole 35a of a mandrel 35 by the blank holder 36. The laminated blank 11 is pressed against the end face of the core metal 35 with a processing device not shown and rotated together with the mandrel 35. Then, a roll 37 held rotatably by a holder 37a is moved in parallel to the axis of the mandrel 35 while keeping a clearance C between the circumferential surface of the mandrel 35 and the peripheral surface thereof to obtain a cylindrical pot-shaped laminated shell 31. When leaving a flange 31g also in this process, the laminated shell 31 may be pushed out simply from the mandrel 35.

The body $31f$ of the laminated mold 31 is also subjected to ironing in the spinning as same as in the press forming.

Figure 15B:
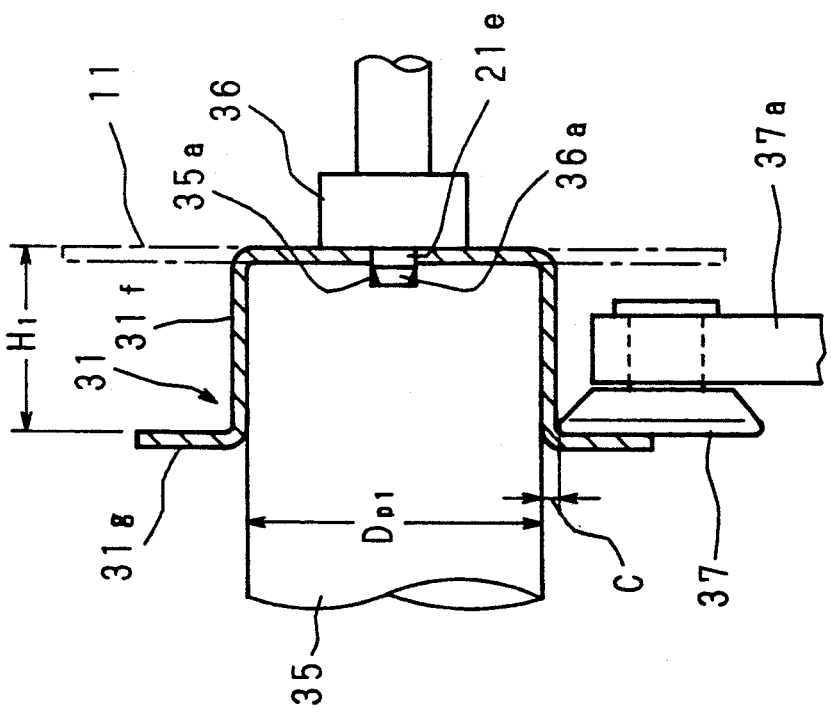

The spinning is not only effective for obtaining the cylindrical laminated shell 31 from the flat laminated blank 11, but also applicable when applying ironing by the spinning to the laminated shell 21, which is provided with the through hole 21e, if necessary, after the deep drawing and fitted around the mandrel 35 as shown in FIG. 15(b).

At press forming shown in FIG. 10, linear scratch marks may be created depthwise on the inner and outer surfaces of the cylindrical body $21f$ of the laminated shell 21 due to sliding between the die 25 and the blank holding plate 26. Also at spinning shown in FIG. 15, scratch marks may be created spirally on the inner and outer surfaces of the cylindrical body $31f$ of the laminated shell 31 not lubricatly. In either case, treatment must be taken on the scratch marks when the inner and outer metal layers are used as it is as the inner and outer ring belts 4 of the laminated belt.

Accordingly, when the laminated blank 11' bonded with the auxiliary plate 11c on both surfaces shown in FIG. 5(a), or the laminated blank 11" provided with the auxiliary plate 11c on one surface shown in FIG. 5(b) is used both, the inside surface and the, outside surface of the laminated belt or either one surface of the laminated belt are protected.

(C) Annular Cutting

Figure 16:
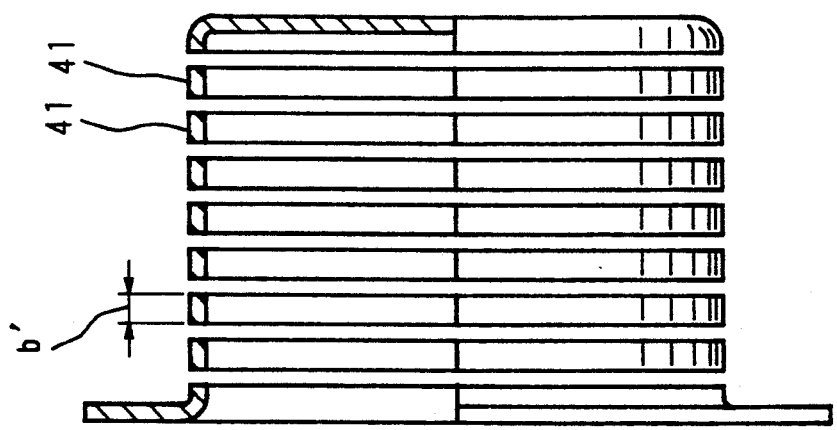
FIG. 16 is a half-cut view of a half-finished product of a laminated mold cut into annular sections.

Next, the cylindrical body $21f$ (or $31f$) of the laminated shell 21 (or 31) obtained by the press forming or spinning is cut into sections as shown in FIG. 16 to obtain bonded laminated rings 41, 41 .... As the cutting method, a cutting with a cutting tool, a rotary blade cutting, a laser beam cutting and a wire saw cutting will be described. Incidentally, the width b' of the bonded laminated ring 41 may be equivalent to the width b of the laminated belt 1 which is a final product only in the case wherein the end finishing is not performed in the following process.

Figure 17A:
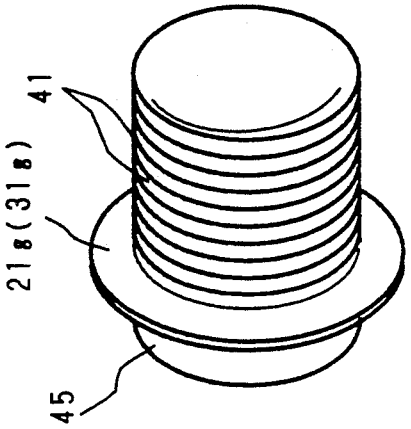
FIG. 17 is a sectional view showing a cutting mode with a cutting tool.
Figure 17B:
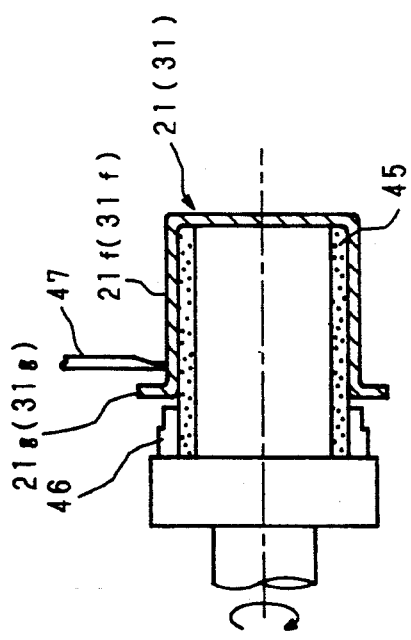

FIG. 17 (a) is an explanatory view showing a cutting mode with a cutting tool of the laminated shell 21 (or 31) by a lathe, and FIG. 17(b) shows a fragmentary enlarged sectional view of the cut portion. As shown in FIG. 17 (a), a tubular core member 45 is pressed into the laminated shell 21 (or 31), said core member 45 is grasped by a chuck 46 for rotation and the cylindrical body $21f$ (or $31f$) is cut across by a cutting tool 47. There are two purposes for using the core member 45. One purpose is to prevent a metal layer 21a from deforming as shown in FIG. 17(d) at cutting, when the metal layer 21a of the body $21f$ of the laminated shell 21 is thin and the rigidity is insufficient. Another purpose is to prevent the bonded laminated ring 41 from deforming when the resin layer 21b is heated and burned off in the following process. Thus, the core member 45 is preferably made of a metal endurable to heating.

Figure 17C:
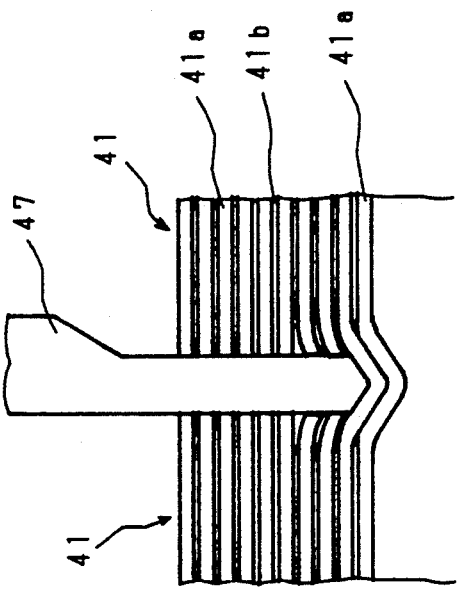
Figure 17D:
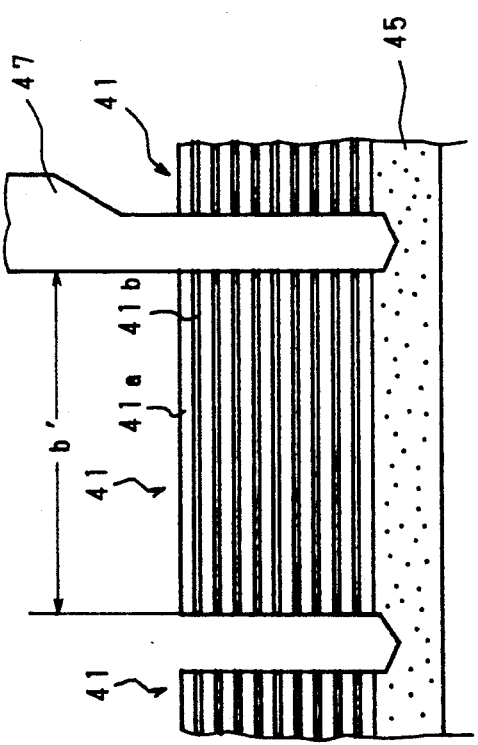

Cutting may be carried out continuously one after another by cutting through to the middle of the core member 45 by the cutting tool 47 as shown in FIG. 17(b). It is also possible to obtain a number of bonded laminated rings 41 simultaneously by arranging the necessary number of cutting tools 47 at a cutting pitch. FIG. 17(c) is a perspective view showing the state after the cutting.

Figure 18A:
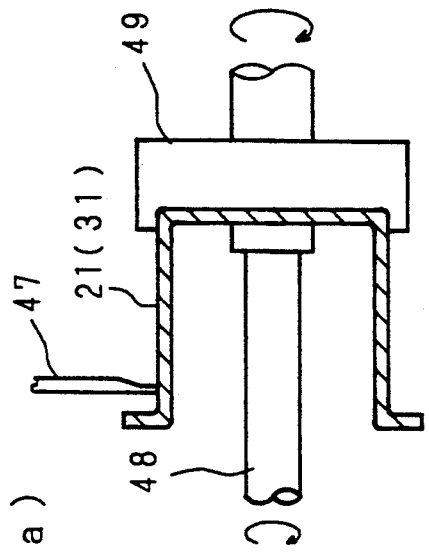
FIG. 18 is a sectional view showing a cutting mode of a laminated shell bonded with an auxiliary plate shell at least inside with a cutting tool.
Figure 18B:
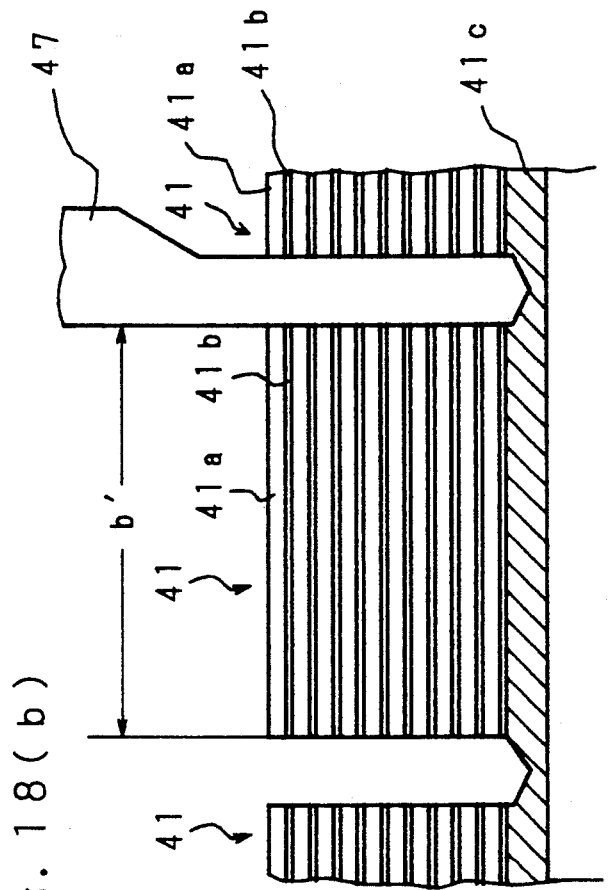

In the case of the laminated shell 21', 21" as shown in FIGS. 13(b), (c) using the laminated blank 11' or 11" bonded with the auxiliary plate 11c as shown in FIGS. 5(a), (b), when cutting its cylindrical body $21f$ a mold of the inner auxiliary plate 11c may be used in place of the core member 45 in FIG. 17(a). When the thickness of the shell 41c of the auxiliary plate 11c is determined by taking into account of rigidity, as shown in FIG. 18(b), the laminated shell 21 (or 31) may be pressed against the chuck 49 with a rotatable tail spindle 48 and cut by the cutting tool 47 while rotating the chuck 49. Also in this case, as shown in FIG. 18(b), the shell 41c of the auxiliary plate 11 is cut through to the middle of the shell to obtain the same half-finished cut product as those shown in FIG. 17(c).

Figure 19A:
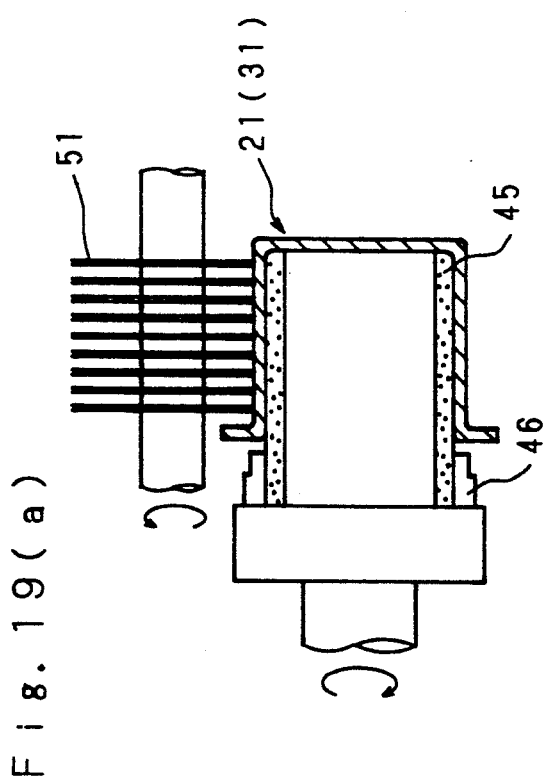
FIG. 19 is a sectional view showing a cutting mode with rotary blades.
Figure 19B:
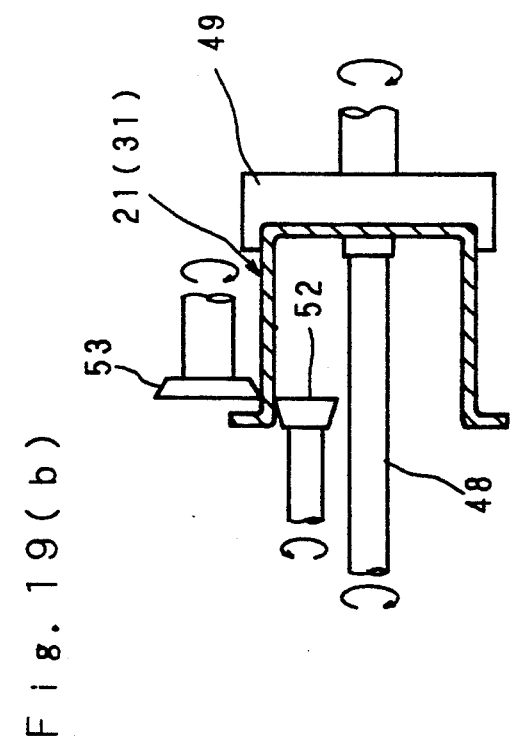

FIG. 19 is a schematic view showing a cutting mode by a rotary blade, FIG. 19(a) shows the case of cutting by a grinding blade 51 and FIG. 19(b) shows the case of cutting by inner and outer rotary blades 52, 53. In FIG. 19(a), as same as FIG. 17(a), the core member 45 pressed into the laminated shell 21 (or 31) is grasped by the chuck 49 for rotation and cut through by the rotating grinding blade 51. The core member 45 is cut to the middle thereof by the grinding blade 51 as same as in FIG. 17(b). Also in this case, when the laminated blanks 11' or 11" having the auxiliary plate 11c is used in place of the core member 45, the latter may be omitted.

In FIG. 19(b), there is shown a method in which the laminated shell 21 (or 31) is pressed against the chuck 49 with the tail spindle 48 and grasped with the chuck 49 for rotation, then its cylindrical body 21f (or 31f) is clamped by inner and outer blades 52, 53 set inside and outside thereof so as to be cut off in the direction of thickness by narrowing gradually by the gap between the rotary blades. It may also be possible to rotate the chuck 49 idly and rotating the inner blade 52 or the outer blade 53 circumferentially of the cylindrical body 21f (or 31f) for cutting.

Figure 20A:
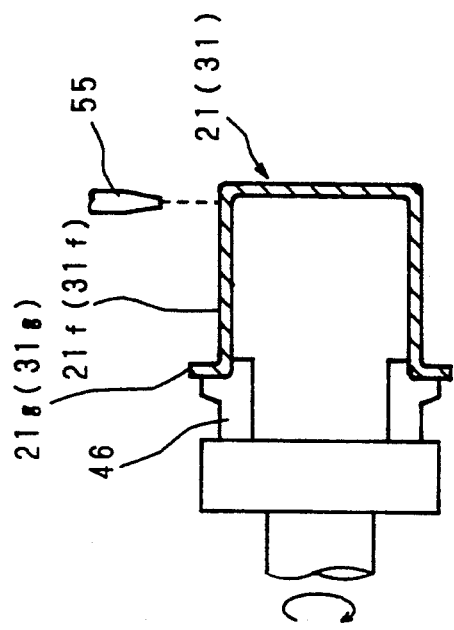
FIG. 20 is a sectional view showing a cutting mode with laser beams.

FIG. 20 (a), (b) are schematic view showing a cutting mode with laser beams. In FIG. 20(a), the laminated shell 21 (or 31) is grasped by the chuck 46 for rotation, and the cylindrical body 21f (or 31f) is fused by laser beams from a laser gun 55 to obtain the bonded laminated ring 41 one by one.

Figure 20B:
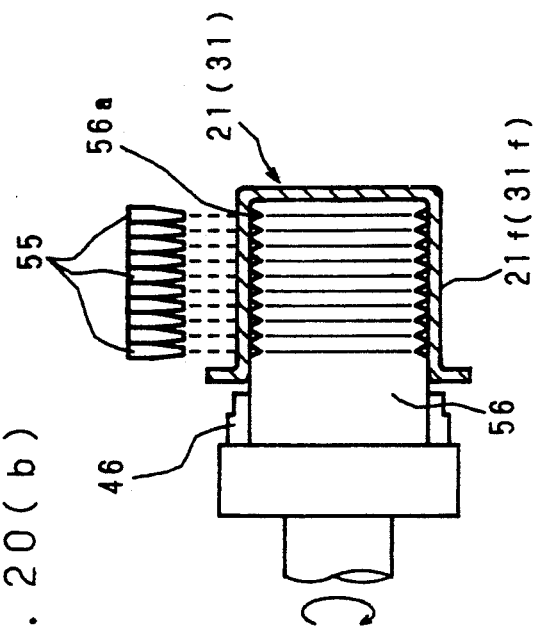

FIG. 20(b) is a schematic view showing the case wherein a number of rings are cut simultaneously. The core member 45 having a plurality of grooves 56a, 56a, ... on the surface is fitted into the laminated shell 21 (or 31) and grasped by the chuck 46 for rotation. The laser guns 55, 55 ... are opposed respectively to the grooves 56a, 56a, ... on the core member 56, and a molten metal is adapted to accumulate in the groove 56a. When the molten metal deposits on the cut surface or the cut surface are not smooth, the end surface of the laminated ring 41 may be polished after cutting.

FIG. 21 is a schematic view showing a cutting mode with a wire saw, FIG. 21(a) is a perspective view showing a cutting state and FIG. 21 (b) is a fragmentary enlarged sectional view after cutting. The tubular core member 45 pressed into the laminated mold 21 (or 31) is grasped by the chuck 46 for rotation while abrasive slurry is fed through a pipe 58a provided in a nozzle 58, onto wires 59, 59 ... which are stretched at a predetermined pitch orthogonally to the axis of the laminated shell 21 (or 31) and traveled, the rotating laminated shell 21 (or 31) is raised gradually by means of a device not shown and cut through. FIG. 21 (b) shows the state wherein the cutting proceeds to the core member 45, thereafter the wires 59 are drawn out and the cutting is finished. In the case of wire saw cutting, as shown in FIG. 18(b), it will be appreciated that the auxiliary plate shell 41c may be used in view of the core member 45.

(D) Bonding Resin Removing Process from Bonded Laminated Ring

Next, a method of removing the resin layer 41b from the bonded laminated metal ring 41 will be explained. There are two typical methods, one is to dissolve and remove the resin layer 41b by an organic solvent and the other is to remove the resin layer 41 by heating and burning. In the dissolving process, the bonded laminated ring 41 or a half-finished cut product fitted to the core member 45 shown in FIG. 17(c), or the half-finished cut product having the auxiliary plate shell 41c shown in FIG. 18(b) is soaked into the organic solvent, and heated, if necessary, dissolving the resin layer 41b, 41b ... gradually from the cut end to obtain the laminated ring 61 as shown in FIG. 22. Between the individual ring belt 62a constituting the laminated ring 61, a gap equivalent to the thickness of the resin layer 41b removed is secured, serving as a moderate fitting allowance for circumferential friction sliding of the individual ring belt 4 of the laminated belt 1 shown in FIG. 2.

Figure 23A:
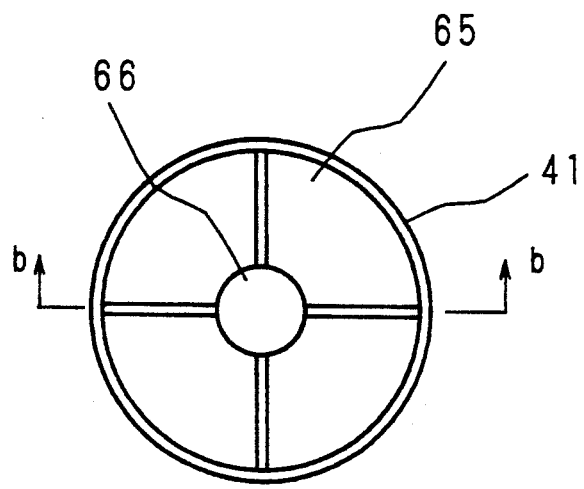
FIG. 23 is a plan view showing a using mode of an expanding jig when removing resin by heating and burning, and a sectional view taken along the line b—b thereof.
Figure 23B:
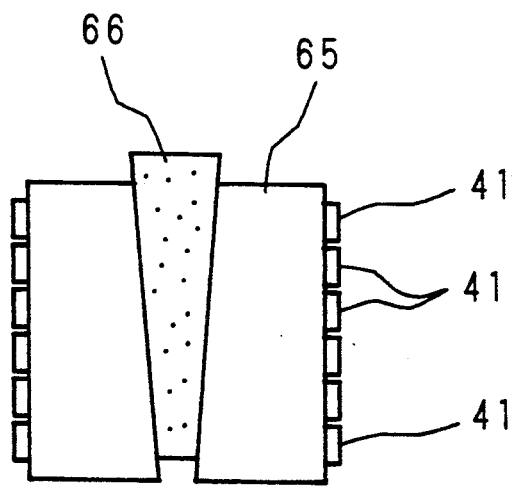

A burning process will be explained next. The half-shaped cut product fitted to the core member 45 shown in FIG. 17(c) or the half-finished cut product shown in FIG. 17(b) is heated and the resin layer 41b is burned off to obtain the laminated ring 61 shown in FIG. 22. In this case, carbides of the resin deposited on the surface of the ring belt 61a are removed by decomposing the laminated ring 61 and by grinding/polishing or so. Deformation of the bonded laminated ring 41 at heating and burning does not occur since the inside surface is supported by the core member 45 or the auxiliary plate mode 41c. In the heating and burning process aforementioned, for the bonded laminated ring 41 wherein the core member 45 or the auxiliary plate shell, 41c is not provided, or even when the auxiliary plate shell 41c is used but its rigidity is so small that the deformation at heating can not be prevented, for example, a well-known expanding jig 65 is used as shown in FIG. 23. FIG. 23(a) is a schematic view showing the state wherein the expanding jig 65 is used, and FIG. 23(b) is a sectional view taken along the line b—b of FIG. 23(a). The expanding jig 65 is divided circumferentially and constructed to apply an appropriate tension circumferentially to the bonded laminated ring 41 by forcing a wedge 66 into the center portion, thereby keeping the bonded laminated ring 41 circularly.

(E) Surface Treatment of Ring Belt

The laminated ring 61 in which a predetermined number of ring belts 61a are fitted each other at a moderate distance is obtained in such a manner. To the laminated belt 1, repetitive bending and restoring force are added continuously in the state where tension is applied as previously stated, and the individual ring belt 4 are subjected to frictional sliding. Accordingly, the individual ring belt 4 must have enough strength and surface hardness to endure. Since bending stress is naturally larger in the vicinity of the surface of the ring belt 4, its strength or hardness is preferably distributed so as to become higher in the vicinity of the surface of the ring belt 4.

As a method of intensifying the strength or hardness near the surface, a caburizing treatment or a nitriding treatment known hitherto is employed. These surface hardening treatments may be performed in advance in the stage of producing a blank metal coil 12. In this case, the surface hardening treatment after producing the laminated ring 61 is not necessary. The surface hardening treatment may be conducted not in the stage of the blank metal coil 12 but after producing the laminated ring 61. It is also possible to perform the carburizing simultaneously in the heating and burning process of the resein layer 41b aforementioned by using resin as a carbonic source.

In addition to the surface hardening treatment, heat treatment for increasing the entire strength or hardness of the ring belt 61a in the direction of thickness is conducted, if necessary. As this method, for example, age hardening treatment is employed. This method may be performed after producing the laminated ring 61. Also, it may be carried out simultaneously in the heating and burning process of the resin layer 41b previously stated.

Now, in order to improve the endurability of the laminated belt 1, besides heat treatment for increasing the strength or hardness as described heretofore, it is also effective to form residual stresses by compression circumferentially on the surface of the ring belt 61a. The compressive residual stresses serve to reduce the tensile stress in use near the surface. An example of a method of forming the compressive residual stresses is shot blasting. Since uneven fine patterns are formed on the surface in the shot blasting, lubricating oil is held in the hollows, thus it is efficacious in restraining wear due to friction between the rings when the belt is used. The shot blasting may be performed by decomposing the laminated ring 61 which is to be reassembled.

Incidentally, when the residual stress is not necessary to be applied and the purpose is just to restrain wear by providing the uneven surface, the shot blasting may be applied in the stage of producing the blank sheet 11a.

Next, a production process of the laminated belt 1 having the multiple-layer ring belt 4 by a method of the invention will be described.

The inside diameter of the innermost ring belt 4 was set at 216.9 mm and the width at 8.7 mm.

NUMERICAL EXAMPLE 1

A maraging steel coil of 0.2 mm thickness was used as a metal coil 12 shown in FIG. 6, and a resin film 13 of polypropylene (shearing strength $\rho=180$ kgf/cm$^2$) of 30 μm thickness was repeatedly bonded and laminated to obtain a 10-layer bonded laminated coil 16, from which a laminated blank 11 having the diameter 320 mm was punched out, and further an auxiliary plate 11c having the diameter 320 mm and the thickness 2.3 mm and made of low-carbon steel was heated and pressed onto one surface with polypropylene ($\tau=180$ kgf/cm$^2$) of 30 μm thickness interposed therebetween. Then, as shown in FIG. 10, deep drawings was performed while facing the auxiliary plate inward to obtain a laminated shell 21 having the depth $H_1=80$ mm as shown in FIG. 12, by using a punch 27 of $D_{p1}=212.9$, $r_p=2$ mm and a die 25 of $D_{d1}=220.8$, $r_d=5$ mm as shown in FIG. 10. In this laminated shell 21, the thickness of an auxiliary plate shell 41 of the cylindrical body 21f was 2.0 mm, the thickness of a metal layer 21a was 0.182 to 0.183 mm and the thickness of a resin layer 21b was 5 to 13 μm. Then, with a method shown in FIG. 18, while leaving seven bonded laminated ring belts 41, 41, . . . of b'=8.7 mm and cutting through to the middle of the auxiliary plate shell 41c, a half-finished cut product was heated at 500° C. to burn the resin layers 41b, 41b, . . . . After decomposing the resulting laminated ring 61 and removing residues of resin carbides deposited on the ring belt 61a by polishing, aging was performed at 480° C. for 3 hours, and further ion nitriding was conducted at 500° C. to obtain the surface hardness of Hv850 and the center hardness of Hv550, then a surface oxide was removed by acid pickling and after shot blasting the ring belts 61a are reassembled to be the laminated belt 1.

NUMERICAL EXAMPLE 2

A maraging steel coil of 0.3 mm thickness was used as a metal coil 12, and with a method shown in FIG. 9 a resin film 13 of polypropylene ($\tau=180$ kgf/cm$^2$) of 50 μm thickness was stuck onto its one surface, from one-surface bonded coil 19 a disk having the diameter of 340 mm and comprising blank sheet 11a and resin layer 11b was punched out and piled up in 10 layers, on the uppermost resin layer an auxiliary plate 11c made of low-carbon steel and having the diameter of 340 mm and the thickness of 2.3 mm was placed and bonded by a hot press, then using a punch 27 of $D_{p1}=213.3$, $r_p=3$ mm and a die 25 of $D_{d1}=230.0$, $r_d=5$ mm shown in FIG. 10 for deep drawing while facing the auxiliary plate 11c inward, and using a die 29 of $D_{d2}=226.0$ mm shown in FIG. 14 for ironing, a laminated mold 21 having the depth $H_1=80$ mm shown in FIG. 12 was obtained. The thickness of an auxiliary plate mold 41c at the cylindrical body 21f was 1.8 mm, the thickness of a metal layer 21a was 0.180 to 0.185 mm and the thickness of a resin layer 21b was 7 to 11 μm. Thereafter, with a grinding blade 51 shown in FIG. 19(a), the auxiliary plate mold 41c was cut through to the middle thereof at a distance of b'=8.7 mm, a resulting half-finished cut product was soaked into tetralin heated to 130° C. to dissolve and remove the resin layers 41b, 41b, . . . , then after aging at 480° C. for 3 hours and ion nitriding further at 500° C. to obtain the surface hardness Hv840 and the center hardness Hv540, a laminated ring 61 was decomposed and after shot blasting assembled again to be the laminated belt 1.

NUMERICAL EXAMPLE 3

After nitriding ten sheets of maraging steel having the thickness 0.2 mm and the diameter 320 mm to obtain the surface hardness Hv980 and the center hardness Hv350, laminated with polypropylene films ($\tau=180$ kgf/cm$^2$) of 30 μm thickness interposed therebetween, and bonded together with a hot press, then using a punch 27 of $D_{p1}=216.9$, $r_9=2$ mm and a die 25 of $D_{d1}=\phi220.8$, $r_d=2$ mm shown in FIG. 10 for deep drawing, a laminated shell 21 having the depth $H_1=80$ mm was obtained. The thickness of a 10-layer metal layer 21a of the cylindrical body 21f in the laminated shell 21 was 0.183 to 0.186 mm and that of a resin layer 21b was 8 to 12 μm. Thereafter, by a method shown in FIG. 20(a) seven bonded laminated rings 41, 41, . . . of 9.0 mm width were cut one by one, cut ends being ground and finished to the width of 8.7 mm, then the inside face was pressed by an expanding jig 65 shown in FIG. 23 and after the resin layers 41b, 41b, . . . being burned at 500° C. and aged to obtain the surface hardness Hv850 and the center hardness Hv530, a laminated ring 61 was decomposed to polish off residues of resin carbides deposited on a ring belt 61a, then after shot blasting the ring belts are reasembled to be a laminated belt 1.

NUMERICAL EXAMPLE 4

After nitriding 10 sheets of maraging steel having the thickness 0.3 mm and the diameter 320 mm to obtain the surface hardness Hv790 and the center hardness Hv520, laminated with polypropylene films ($\tau=150$ kgf/cm$^2$) having the thickness 50 μm interposed therebetween, heated and pressed further with a hot press while placing low-carbon steel auxiliary plates 11c, 11c having the diameter 340 mm and the thickness 2.0 mm and 1.0 mm on the uppermost and lowermost portions with the resin films interposed therebetween, then a through hole 21e was open in the center and with a method shown in FIG. 15, the side of the auxiliary plate 11c having the thickness 2.0 mm was opposed to a core metal 35 of $D_{p1}=215.3$ mm for spinning to obtain a laminated shell 31 having the depth $H_1=130$ mm shown in FIG. 12. The thickness of a metal layer 31a at the cylindrical body 31f was 0.181 to 0.189, the thickness of a resin layer 31b was 6 to 13 μm and the thickness of the inner and outer auxiliary plate shells 41c, 41c was respectively 0.8 mm and 0.4 mm. Thereafter, with a method shown in FIG. 21(a), using a wire 59 having the diameter 0.2 mm and cutting through to the middle of the inner auxiliary plate shell 41c at a distance of b'=8.7 mm, a half-finished cut product was heated at 400° C. to burn the resin layers 41b, 41b, . . . . A resulting laminated ring 61 was decomposed to polish off residues of resin carbides deposited on a ring belt 61, then the ring belts 61 are reassembled to be a laminated belt 1.

NUMERICAL EXAMPLE 5

A maraging steel coil of 0.4 mm thickness was used as a metal coil 12, and with a method shown in FIG. 6, a resin film 13 of polypropylene ($\tau = 180$ kgf/cm$^2$) of 50 $\mu$m thickness was bonded and laminated, from a resulting 10-layer bonded laminated coil 16 a laminated blank 11 having the diameter 300 mm was punched out, then using a punch 27 of $D_{p1} = 216.9$ mm, $r_p = 4$ mm and a die 25 of $D_{d1} = \phi 224.0$, $r_d = 4$ mm shown in FIG. 10 for deep drawing, and using a die 29 of $D_{d2} = \phi 220.8$ shown in FIG. 14 for ironing, a laminated mold 21 having the depth $H_1 = 160$ mm shown in FIG. 12 was obtained. The thickness of a metal layer 21a at the body 21f was 0.182 to 0.185 mm and that of a resin layer 21b was 6 to 10 $\mu$m. Thereafter, with a method shown in FIG. 20(b) the bonded laminated ring 41 of 9.0 mm width was cut into 16 pieces by multi laser guns and cut surfaces were finished to the width of 8.7 mm, then the inside surface was pressed by an expanding jig 65 shown in FIG. 23 and heated in a vacuum oven at 500° C. for 3 hours to burn the resin layers 41b, 41b, . . . , after carburizing the carbides on the ring surface of maraging steel as a carbonic source and aging simultaneously, the resulting laminated ring 61 was decomposed to polish off residues of resin carbides, then the ring belts 61a are assembled again to be a laminated belt 1.

NUMERICAL EXAMPLE 6

Molten polypropylene was coated continuously onto one surface of a coil made of SUS304 of 0.2 mm thickness and cooled to form a resin layer ($\tau = 180$ kgf/cm$^2$) of 35 $\mu$m thickness. A disc comprising a blank sheet 11a and a resin layer 11b and having the diameter of 320 mm was punched out from the coil. Nine sheets of such disc and a blank sheet 11a of 0.2 mm thickness and 320 mm diameter made of SUS304 and not coated with resin were laminated, heated and pressed by a hot press to form a laminated blank 11, which was drawn by using a punch 27 of $D_{p1} = 216.9$ mm, $r_p = 2$ mm and a die 25 of $D_{d1} = 222.5$ mm, $r_d = 2$ mm shown in FIG. 10, and successively spinned to the outside diameter of 220.8 mm with a method shown in FIG. 15(b) to obtain a laminated shell 31 having the depth $H_1 = 80$ mm in FIG. 12. The thickness of a metal layer 31a at the cylindrical body 31f was 0.181 to 0.187 and that of a resin layer 21b was 8 to 12 $\mu$m. Thereafter, with a method shown in FIG. 19(b), 7 pieces of bonded laminated rings 41d were cut from the cylindrical body 31f at a distance of 8.8 mm width, cut surfaces being ground for trimming and finished to the width 8.7 mm, then supporting the inside diameter portion with an expanding jig 65 shown in FIG. 23 heated at 500° C. to burn the resin layers 41b, 41b, . . . , a resulting laminated ring 61 was decomposed to polish off residues of resin carbides deposited on a ring belt 61a, then after ion nitriding at 500° C. to the surface hardness Hv1100 and the center hardness Hv300 the ring belts 61a are assembled again to be a laminated belt 1.

NUMERICAL EXAMPLE 7

After nitriding 10 sheets of blank sheet 11a made of SUS304 and having the thickness of 0.2 mm and the diameter of 340 mm to the surface hardness Hv1000 and the center hardness Hv300, laminated with a polypropylene film ($\tau = 180$ kgf/cm$^2$) having the thickness of 40 $\mu$m interposed therebetween, then a low-carbon steel auxiliary plate 11c having the thickness of 2.3 mm and the diameter of 340 mm was overlapped on the uppermost portion with the resin films interposed therebetween, heated and pressed by a hot press to form a laminated blank 11, which was deep drawn by using a punch 27 of $D_{p1} = 212.7$ mm, $r_p = 5$ mm and a die 25 of $D_{d1} = 224.0$ mm, $r_d = 10$ mm shown in FIG. 10, then ironed by using a die 29 of $D_{d2} = 220.8$ mm shown in FIG. 14 to obtain a laminated mold 21 having the depth $H_1 = 80$ mm shown in FIG. 12. The thickness of an auxiliary plate mold 41c at the cylindrical body 21f was 2.1 mm, the thickness of a metal layer 21a was 0.183 to 0.188 mm and the thickness of a resin layer 21b was 7 to 12 $\mu$m. Thereafter, with a method shown in FIG. 18, cutting through to the middle of the auxiliary plate shell 41c with a cutting tool 47 and heating a half-finished cut product at 500° C. to burn the resin layers 21b, 21b, . . . , a resulting laminated ring 61 was decomposed to polish off resin carbides deposited on a ring belt 61a and the ring belts 61a are assembled again to be a laminated belt 1.

NUMERICAL EXAMPLE 8

A core member 45 made of welded steel tube having the outside diameter of 217.0 mm and the thickness of 3 mm was pressed into a laminated shell 31 obtained by the same method as the numerical example 6, then with a method shown in FIG. 17, the cylindrical body 31f was cut with a cutting tool 47 to the middle of the core member 45 at a distance b′ = 8.7 mm and heated at 500° C. as it is to burn the resin layers 41b, 41b, . . . , a resulting laminated ring 61 was decomposed to polish off residues of resin carbides deposited on a ring belt 61a, and after ion nitriding at 500° C. to the surface hardness Hv1000 and the center hardness Hv300 the ring belts 61a are assembled again to be a laminated belt 1.

NUMERICAL EXAMPLE 9

20 sheets of maraging steel of 380 mm square and having the thickness of 0.1 mm and the hardness of Hv290 were laminated with polypropylene films ($\tau = 180$ kgf/cm$^2$) having the thickness of 30 $\mu$m interposed respectively therebetween. Moreover, heated and pressed with a hot press while placing auxiliary plates 11c made of stainless steel SUS304, on the uppermost and lowermost portions with the resin films interposed therebetween. From this a laminated blank 11 having the diameter of 360 mm was punched out and deep drawn by using a punch 27 of $D_{p1} = 215.4$ mm, $r_p = 4$ mm and a die 25 of $D_d = 222.2$ mm, $r_d = 4$ mm shown in FIG. 10 to obtain a laminated shell 21 having the depth $H_1 = 120$ mm. The thickness of a metal layer 21a at the cylindrical body 21f was 0.8 to 0.10 mm, the thickness of a resin layer 21b was 7 to 11 $\mu$m and the thickness of the inner and outer auxiliary plate shells 41c, 41c was respectively 0.72 mm and 0.68 mm. Thereafter, with a method shown in FIG. 20(b), cut into 12 pieces of bonded laminated rings 41, 41, . . . having the width of 9.0 mm with multi laser guns. Cut ends of respective bonded laminated rings 41 were finished to the width of 8.7 mm, then pressing the inside surface with an expanding jig 65 shown in FIG. 23, heated in a vacuum oven at 500° C. for 3 hours to burn off the resin layers 41b, 41b, . . . . A resulting laminated ring 61 was decomposed to polish off residues of resin carbides deposited on a ring belt 61a and the ring belts 61a are assembled again to be a laminated belt 1.

NUMERICAL EXAMPLE 10

After nitriding 20 sheets of stainless steel SUS304 of 380 mm square and having the thickness of 0.1 mm to the surface hardness Hv950 and the center hardness Hv200, laminated with polypropylene films ($\tau=180$ kgf/cm$^2$) having the thickness of 30 μm interposed therebetween. While placing auxiliary plates 11c, 11c made of stainless steel SUS304 and having the thickness of 0.8 mm on the uppermost and lowermost portions with resin films interposed therebetween, heated and compressed with a hot press. From this, a laminated blank 11 having the diameter of 360 mm was punched out and deep drawn with the same tools as the numerical example 9 to obtain a laminated shell 21 having the depth $H_1=120$ mm shown in FIG. 12. The thickness of a metal layer 21a at the body 21f was 0.09 to 0.11 mm, the thickness of a resin layer 21b was 7 to 10 μm and the thickness of the inner and outer auxiliary plate shells 41c, 41c was respectively 0.7 mm and 0.65 mm. Thereafter, with a method shown in FIG. 18, cut through to the middle of the inner auxiliary plate shell 41 with a cutting tool 47 at a distance $b'=0.65$ mm. A half-finished cut product was heated at 500° C. to burn off the resin layers 21b, 21b, . . . . A resulting laminated ring 61 was decomposed to polish off resin carbides deposited on a ring belt 61a, then the ring belts 61a are assembled again to be a laminated belt 1.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method of producing a laminated metal belt in which a plurality of ring belts each having a different circumferential length are laminated in one unit comprising:
    a first step of bonding a plurality of metal sheets together with resin to form a laminated sheet, said laminated sheet having resin between the metal sheets;
    a second step of forming a seamless cylindrical body from said laminated sheet by deep drawing or spinning said laminated sheet;
    a third step of cutting said cylindrical body radially to obtain a bonded laminated ring; and
    a fourth step of removing resin from said laminated ring to form said laminated metal belt.

2. A method of producing a laminated metal belt as set forth in claim 1, wherein the shearing strength of said resin is 150 to 250 kgf/cm$^2$.

3. A method of producing a laminated metal belt as set forth in claim 2, wherein said resin is polypropylene.

4. A method of producing a laminated metal belt as set forth in claim 1, wherein said second step comprises deep drawing said laminated sheet and ironing said deep drawn laminated sheet to obtain said cylindrical body.

5. A method of producing a laminated metal belt as set forth in claim 1, wherein spinning is applied to said cylindrical body in said second step.

6. A method of producing a laminated metal belt as set forth in claim 1, wherein the laminated sheet is subjected to deep drawing by press molding and ironing by spinning in said second step.

7. A method of producing a laminated metal belt as set forth in claim 1, wherein a cylindrical core is pressed into said cylindrical body in said third step.

8. A method of producing a laminated metal belt as set forth in claim 7, wherein said core is made of metal.

9. A method of producing a laminated metal belt as set forth in claim 1, wherein said resin is dissolved and removed by an organic solvent in said fourth step.

10. A method of producing a laminated metal belt as set forth in claim 1, wherein said resin is heated and burned off in said fourth step.

11. A method of producing a laminated metal belt as set forth in claim 10, wherein the surface of each ring of the laminated ring from which resin is heated and burned off is ground.

12. A method of producing a laminated metal belt as set forth in claim 10, wherein the surface of each ring of the laminated ring from which resin is heated and burned off is polished.

13. A method of producing a laminated metal belt as set forth in claim 1, wherein said first step further comprising surface hardening of said laminated sheet.

14. A method of producing a laminated metal belt as set forth in claim 10, wherein said fourth step further comprising carburizing with said resin as a carbonic source when said resin is heated and burned off.

15. A method of producing a laminated metal belt as set forth in claim 10, wherein said fourth step further comprising aging heat treatment on each ring of said laminated ring when said resin is heated and burned off.

16. A method of producing a laminated metal belt as set forth in claim 1, further comprising;
    a fifth step for hardening the surface of each ring of said laminated ring from which resin is removed.

17. A method of producing a laminated metal belt as set forth in claim 16, wherein the surface of each ring of said laminated ring is hardened by carburizing in said fifth step.

18. A method of producing a laminated metal belt as set forth in claim 16, wherein the surface of each ring of said laminated ring is hardened by nitriding in said fifth step.

19. A method of producing a laminated metal belt as set forth in claim 16, wherein said fifth step further comprising aging heat treatment on each ring of said laminated ring whose surface is hardened.

20. A method of producing a laminated metal belt as set forth in claim 16, wherein said fifth step further comprising shot blasting on each ring of said laminated ring whose surface is hardened.

21. A method of producing a laminated metal belt in which a plurality of ring belts each having a different circumferential length are laminated in one unit comprising:
    a first step of bonding a plurality of metal sheets together with resin to form a laminated sheet, said laminated sheet having resin between the metal sheets and at least one surface of said laminated sheet being bonded to an auxiliary plate;
    a second step of forming a seamless cylindrical body with said auxiliary plate inside by deep drawing or spinning said laminated sheet;
    a third step of cutting said cylindrical body diametrically to obtain a bonded laminated ring; and
    a fourth step of removing resin from said laminated ring to form said laminated metal belt.

22. A method of producing a laminated metal belt as set forth in claim 21, wherein the shearing strength of said resin is 150 to 250 kgf/cm².

23. A method of producing a laminated metal belt as set forth in claim 21, wherein said resin is polypropylene.

24. A method of producing a laminated metal belt as set forth in claim 21, wherein each metal sheet is maraging steel.

25. A method of producing a laminated metal belt as set forth in claim 21, wherein each metal sheet is stainless steel.

26. A method of producing a laminated metal belt as set forth in claim 21, wherein said second step comprises deep drawing said laminated sheet and ironing said deep drawn laminated sheet with said auxiliary plate bonded to obtain said cylindrical body.

27. A method of producing a laminated metal belt as set forth in claim 21, wherein spinning is applied to said cylindrical body in said second step.

28. A method of producing a laminated metal belt as set forth in claim 21, wherein the laminated sheet is subjected to deep drawing by press molding and ironing by spinning in said second step.

29. A method of producing a laminated metal belt as set forth in claim 21, wherein said resin is dissolved and removed by an organic sovent in said fourth step.

30. A method of producing a laminated metal belt as set forth in claim 21, wherein said resin is heated and burned off in said fourth step.

31. A method of producing a laminated metal belt as set forth in claim 30, wherein the surface of each ring of the laminated ring from which resin is heated and burned off is ground.

32. A method of producing a laminated metal belt as set forth in claim 30, wherein the surface of each ring of the laminated ring from which said resin is heated and burned off is polished.

33. A method of producing a laminated metal belt as set force in claim 21, wherein said first step further comprising surface hardening of said laminated sheet.

34. A method of producing a laminated metal belt as set forth in claim 30, wherein said fourth step further comprising carburizing with said resin as a carbonic source when said resin is heated and burned off.

35. A method of producing a laminated metal belt as set forth in claim 30, wherein said fourth step further comprising aging heat treatment on each ring of said laminated ring when said resin is heated and burned off.

36. A method of producing a laminated metal belt as set forth in claim 21, further comprising;
a fifth step for hardening the surface of said laminated ring from which resin is removed.

37. A method of producing a laminated metal belt as set forth in claim 36, wherein the surface of each ring of said laminated ring is hardened by carburizing in said fifth step.

38. A method of producing a laminated metal belt as set forth in claim 36, wherein the surface of each ring of said laminated ring is hardened by nitriding in said fifth step.

39. A method of producing a laminated metal belt as set forth in claim 36, wherein said fifth step further comprises aging heat treatment on each ring of said laminated ring whose surface is hardened.

40. A method of producing a laminated metal belt as set forth in claim 36, wherein said fifth step further comprises shot blasting on each ring of said laminated ring whose surface is hardened.

* * * * *